(12) United States Patent
Takano

(10) Patent No.: US 10,390,329 B2
(45) Date of Patent: Aug. 20, 2019

(54) DEVICE AND SYSTEM

(71) Applicant: SONY CORPORATION, Tokyo (JP)

(72) Inventor: Hiroaki Takano, Saitama (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/502,703

(22) PCT Filed: Jul. 31, 2015

(86) PCT No.: PCT/JP2015/071795
§ 371 (c)(1),
(2) Date: Feb. 8, 2017

(87) PCT Pub. No.: WO2016/047273
PCT Pub. Date: Mar. 31, 2016

(65) Prior Publication Data
US 2017/0238281 A1 Aug. 17, 2017

(30) Foreign Application Priority Data
Sep. 25, 2014 (JP) ................. 2014-194715

(51) Int. Cl.
H04W 16/14 (2009.01)
H04W 24/08 (2009.01)
(Continued)

(52) U.S. Cl.
CPC ......... *H04W 72/005* (2013.01); *H04W 16/14* (2013.01); *H04W 24/08* (2013.01);
(Continued)

(58) Field of Classification Search
CPC . H04W 68/005; H04W 72/042; H04W 84/12; H04W 72/005; H04W 16/14;
(Continued)

(56) References Cited

U.S. PATENT DOCUMENTS 9,756,660 B2 * 9/2017 Seok .................. H04W 74/04
9,867,054 B2 * 1/2018 Zhang ................ H04W 16/14
(Continued)

FOREIGN PATENT DOCUMENTS

GB 2496221 A 5/2013
JP 2006-94001 A 4/2006
(Continued)

OTHER PUBLICATIONS

International Search Report dated Sep. 29, 2015 in PCT/JP15/071795 Filed Jul. 31, 2015.
(Continued)

Primary Examiner — Ayaz R Sheikh
Assistant Examiner — Debebe A Asefa
(74) Attorney, Agent, or Firm — Xsensus, LLP

(57) ABSTRACT

The present application makes it possible to protect a beacon transmitted by an access point of a wireless LAN in a frequency band shared between a cellular system and the wireless LAN. An exemplary implementation of the present application includes a device comprising circuitry configured to acquire information indicating a period prepared at a beacon interval of a wireless LAN, and a first control unit configured to stop wireless communication of a base station of a cellular system in a frequency band shared between the cellular system and the wireless LAN over the period.

20 Claims, 26 Drawing Sheets

(51) Int. Cl.
  H04W 72/00 (2009.01)
  H04W 72/04 (2009.01)
  H04W 84/12 (2009.01)

(52) U.S. Cl.
  CPC ....... *H04W 72/04* (2013.01); *H04W 72/0413* (2013.01); *H04W 84/12* (2013.01); *H04W 72/0446* (2013.01); *H04W 72/0453* (2013.01)

(58) Field of Classification Search
  CPC . H04W 72/04; H04W 24/08; H04W 72/0413; H04W 72/0446; H04W 72/0453
  See application file for complete search history.

(56) References Cited

U.S. PATENT DOCUMENTS

| | | | |
|---|---|---|---|
| 2011/0320588 A1 | 12/2011 | Raleigh | |
| 2012/0034913 A1* | 2/2012 | Wang | H04W 16/14 455/426.1 |
| 2012/0093009 A1 | 4/2012 | Wang et al. | |
| 2013/0208587 A1 | 8/2013 | Bala et al. | |
| 2014/0071925 A1* | 3/2014 | Liu | H04W 28/08 370/329 |
| 2014/0204850 A1 | 7/2014 | Kim et al. | |
| 2017/0215083 A1* | 7/2017 | Kudo | H04W 16/14 |

FOREIGN PATENT DOCUMENTS

| | | |
|---|---|---|
| JP | 2013-528971 A | 7/2013 |
| JP | 2013-530640 A | 7/2013 |
| WO | WO 2011/123527 A1 | 10/2011 |
| WO | 2013/112983 A2 | 8/2013 |

OTHER PUBLICATIONS

Partial Supplementary European Search Report dated Apr. 16, 2018 in corresponding European Patent Application No. 15843900.0 citing documents AA, AO and AP therein, 12 pages.
Extended European Search Report dated Jul. 17, 2018 in European Application No. 15843900.0-1215.

\* cited by examiner

DEVICE AND SYSTEM

TECHNICAL FIELD

The present disclosure relates to a device and a system.

BACKGROUND ART

In the 3$^{rd}$ Generation Partnership Project (3GPP), various technologies for improving system throughput have been discussed. It may be said that a first shortcut for improving the system throughput is increasing a frequency to be used. In the 3GPP, the technology of carrier aggregation (CA) has been considered in Release 10 and Release 11. CA is a technology for improving the system throughput and a maximum data rate by aggregating component carriers (CCs) having a bandwidth of 20 MHz for use. A frequency band available as a CC must adopt the technology of such CA. Thus, a frequency band available for wireless communication of a cellular system is required.

For example, in Patent Literature 1, technology which enables a registered frequency band available for a registered provider and an unlicensed band available when a predetermined condition is satisfied to be used in addition to a dedicated frequency band allocated to each provider for exclusive use is disclosed.

CITATION LIST

Patent Literature

Patent Literature 1: JP 2006-094001A

DISCLOSURE OF INVENTION

Technical Problem

For example, a frequency band (for example, a wireless local area network (LAN) included in a band of 5 GHz) is shared between a cellular system and a wireless LAN. However, when wireless communication of a cellular system in the frequency band is performed, for example, an access point of a wireless LAN may not transmit a beacon at a set beacon interval. Since the beacon is very important information used for synchronization between an access point and a station and connection to a wireless LAN, limitation on an opportunity to transmit the beacon may have an adverse influence on the wireless LAN.

Accordingly, it is desirable to provide a structure capable of protecting a beacon transmitted by an access point of a wireless LAN in a frequency band shared between a cellular system and the wireless LAN.

Solution to Problem

According to the present disclosure, there is provided a device including: an acquiring unit configured to acquire information indicating a period prepared at a beacon interval of a wireless LAN; and a first control unit configured to stop wireless communication of a base station of a cellular system in a frequency band shared between the cellular system and the wireless LAN over the period.

According to the present disclosure, there is provided a device including: an acquiring unit configured to acquire information indicating a period prepared at a beacon interval of a wireless LAN and stopping wireless communication of a base station of a cellular system in a frequency band shared between the cellular system and the wireless LAN; and a measurement unit configured to perform measurement on the frequency band based on the information indicating the period.

According to the present disclosure, there is provided a device including: an acquiring unit configured to acquire information indicating a beacon interval of a wireless LAN which is decided in a cellular system and of which an access point of the wireless LAN is notified by the cellular system; and a setting unit configured to set the beacon interval decided in the cellular system as a beacon interval for the access point.

According to the present disclosure, there is provided a system including: a base station of a cellular system; a terminal device; and an access point of a wireless LAN. The base station includes an acquiring unit configured to acquire information indicating a period prepared at a beacon interval of the wireless LAN, and a first control unit configured to stop wireless communication of the base station in a frequency band shared between the cellular system and the wireless LAN over the period. The first control unit included in the base station transmits the information indicating the period to the terminal device. The terminal device includes an acquiring unit configured to acquire the information indicating the period, and a measurement unit configured to perform measurement on the frequency band based on the information indicating the period. The beacon interval is an interval decided in the cellular system. The first control unit included in the base station notifies the access point of the beacon interval. The access point includes an acquiring unit configured to acquire information indicating the beacon interval, and a setting unit configured to set the beacon interval as a beacon interval for the access point.

Advantageous Effects of Invention

According to the present disclosure described above, it is possible to protect a beacon transmitted by an access point of a wireless LAN in a frequency band shared between a cellular system and the wireless LAN. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
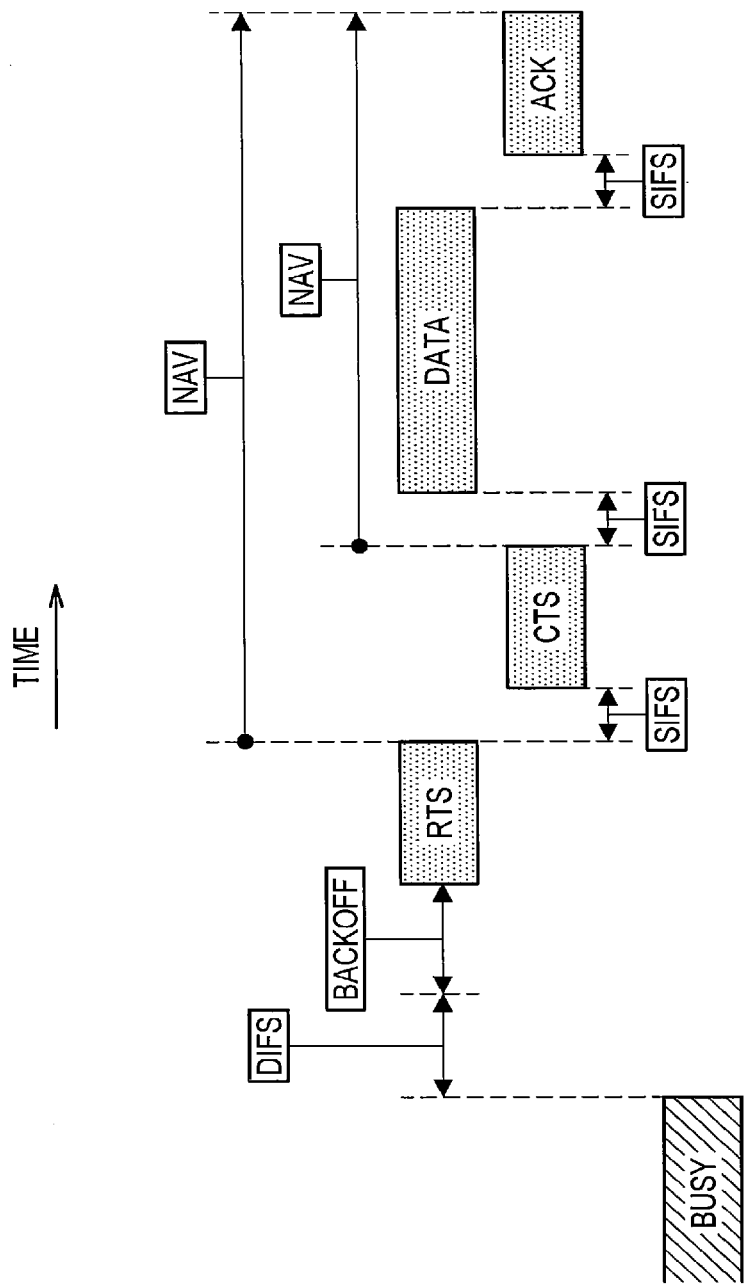
FIG. 1 is an explanatory diagram illustrating an example of data transmission according to IEEE 802.11.

Hereinafter, preferred embodiments of the present disclosure will be described in detail and with reference to the attached drawings. Note that, in this specification and the appended drawings, structural elements that have substantially the same function and structure are denoted with the same reference numerals, and repeated explanation of these structural elements is omitted.

In addition, in the present specification and the drawings, elements having substantially the same functional configurations are distinguished from each other by suffixing different alphabet letters to the same reference numerals. For example, a plurality of elements having substantially the same functional configurations are distinguished as necessary, as in base stations 100A, 100B, and 100C. However, when it is not necessary to distinguish a plurality of elements having substantially the same functional configurations from each other, only the same reference numerals are given. For example, when it is not particularly necessary to distinguish the base stations 100A, 100B, and 100C from each other, the base stations 100A, 100B, and 100C are simply referred to as the base stations 100.

Also, the description will be made in the following order.
1. Introduction
2. Schematic configuration of system
3. Configuration of each device
3.1. Configuration of base station
3.2. Configuration of terminal device
3.3. Configuration of access point
3.4. Configuration of control device
4. Technical features
5. Flow of process
6. Application examples
6.1. Application examples regarding control device
6.2. Application examples regarding base station
6.3. Application examples regarding terminal device
6.4. Application example regarding access point
7. Conclusion «1. Introduction»

First, sharing of a frequency band, technology related to wireless communication, and technology related to a cellular system will be described with reference to FIGS. 1 to 3.

(Sharing of Frequency Band)

(a) Background of Frequency Sharing

A frequency band available for the cellular system is required. For example, a band of 5 GHz is considered as a frequency band for use in the cellular system.

However, the band of 5 GHz is also used in the wireless LAN. Thus, when the cellular system uses the band of 5 GHz, for example, the band of 5 GHz is shared between cellular system and wireless LAN. Specifically, for example, a frequency band of 5 GHz (for example, a channel of a wireless LAN) is used in the wireless LAN communication at a certain time and used in the cellular system at another time. Thereby, frequency utilization efficiency of the band of 5 GHz is improved. Also, the wireless LAN standard includes Institute of Electrical and Electronics Engineers (IEEE) 802.11a, 11b, 11g, 11n, 11ac, and 11ad, etc. and these standards are characterized in that IEEE 802.11 is adopted for a media access control (MAC) layer.

(b) Sharing Technique

Wireless LAN nodes (an access point and a station) are already widespread around the world. For this reason, from the point of view of backward compatibility, it is desirable for a mechanism for sharing a frequency band between a cellular system and a wireless LAN that does not change operations of the wireless LAN nodes to be reviewed as a technique of Long Term Evolution (LTE) and decided as a new standard of LTE. A terminal device conforming to the new standard is considered to use a frequency band shared between the cellular system and the wireless LAN (hereinafter referred to as a "shared band"), while a terminal device not conforming to the new standard is considered not to use the shared band.

(c) Usage as Component Carrier

In LTE, LTE-Advanced, or a cellular system conforming to a communication standard equivalent thereto, the shared band will be used as, for example, a component carrier (CC). Further, it is assumed that the frequency band of the cellular system is used as a primary component carrier (PCC) and the shared band is used as a secondary component carrier (SCC). Also, a control signal and a data signal can be transmitted and received using a frequency band of the cellular system and the data signal can be transmitted and received using the shared band.

(d) Fair Sharing

It is desirable for the shared band to be fairly shared between the cellular system and the wireless LAN. In the wireless LAN, since a channel (the shared band) is fairly shared according to carrier sense multiple access (CSMA), it is desirable for the channel (the shared band) to be fairly shared, for example, even between the cellular system and the wireless LAN through a technique in which CSMA is considered.

Various sharing techniques can be considered as fair sharing. For example, fair sharing can be defined as "the case in which opportunities for the wireless LAN to use the shared band and opportunities for the cellular system to use the shared band are equally given." In other words, it does not means that the cellular system and the wireless LAN are the same in actual communication traffic, and any case in which the same opportunities of communication are given to the cellular system and the wireless LAN is regarded as fair sharing.

As an example, when the shared band is used in the cellular system for a certain period, then the shared band is not used in the cellular system for the same period.

(2) Technology Related to Wireless LAN (a) Data Transmission

An example of data transmission according to IEEE 802.11 will be described with reference to FIG. 1. FIG. 1 is an explanatory diagram illustrating an example of data transmission according to IEEE 802.11.

In IEEE 802.11, a DATA frame and an acknowledgement (ACK) frame are basic frames. When the DATA frame is correctly received, the ACK frame is a frame which causes a transmitting side to know the success of reception of the DATA frame. Although wireless communication can be performed only by the DATA frame and the ACK frame in the wireless LAN, two frames such as a request to send (RTS) frame and a clear to send (CTS) frame are generally further used.

Before the RTS frame is transmitted, each wireless LAN node which performs the wireless LAN communication confirms that no signal is transmitted during a period referred to as a distributed coordination function (DCF) inter-frame space (DIFS). This is referred to as carrier sense. When nodes simultaneously start to transmit signals at a point in time at which the DIFS has elapsed, the signals may collide with each other. Thus, each node waits for a backoff time randomly set for each node and transmits a signal if no signal is transmitted for the backoff time.

Basically, the node cannot transmit the signal while any signal is detected. However, because there is a hidden terminal problem, an RTS frame and a CTS frame including a duration field for setting a value referred to as a network allocation vector (NAV) are added. The NAV is set on the basis of a value included in the duration field. The node setting the NAV avoids transmitting a signal during a period of the NAV.

First, a first node for transmitting the DATA frame transmits the RTS frame. Then, another node located around the first node receives the RTS frame and acquires a value included in the duration field in the RTS frame. The other node sets, for example, its own NAV to the above-mentioned acquired value and avoids transmitting a signal during the period of the NAV. For example, the period of the NAV is a period from the end of the RTS frame to the end of the ACK frame.

Also, a second node for receiving the DATA frame transmits the CTS frame after only a short inter-frame space (SIFS) from the end of the RTS frame according to the reception of the RTS frame. Then, another node located around the above-mentioned second node receives the CTS frame and acquires a value included in the duration field in the CTS frame. The other node sets, for example, its own NAV to the above-mentioned acquired value and avoids transmitting a signal during the period of the NAV. The period of the NAV is a period from the end of the CTS frame to the end of the ACK frame. Thereby, for example, it is possible to prevent the other node (that is, a hidden node for the above-mentioned first node) close to the above-mentioned second node without being close to the above-mentioned first node from transmitting a signal during communication of the above-mentioned first node and the above-mentioned second node.

Also, the RTS frame includes a frame control field, a reception address field, a transmission address field, and a frame check sequence (FCS) in addition to the duration field. Also, the CTS frame includes a frame control field, a reception address field, and an FCS in addition to the duration field.

Also, the DIFS and the SIFS in the standard of the IEEE 802.11 series have, for example, the following lengths.

TABLE 1

|  | 802.11b | 802.11g | 802.11a | 802.11n | 802.11ac |
| --- | --- | --- | --- | --- | --- |
| SIFS | 10 us | 10 us | 16 us | 16 us | 16 us |
| DIFS | 50 us | 28 us | 34 us | 34 us | 34 us |

(b) Beacon

A beacon in IEEE 802.11 will be described with reference to FIG. 2.

(b-1) Beacon Frame

In IEEE 802.11, there are three types of a MAC frame, a management frame, a control frame, and a data frame. The above-described RTS frame, CTS frame, and ACK frame are control frames and the beacon frame is a management frame.

The beacon frame has the same structure as other frames (for example, the RTS frame, the CTS frame, the ACK frame, and the data frame) and includes different information from the other frames.

Also, in the header of the MAC frame, there are fields (a type field and a subtype field) indicating a type of frame. Each of the beacon frame, the RTS frame, the CTS frame, the ACK frame, and the data frame includes the following value in the fields.

TABLE 2

| MAC Frame | Type | Subtype |
| --- | --- | --- |
| Beacon | 00 | 1000 |
| RTS | 01 | 1011 |
| CTS | 01 | 1100 |
| ACK | 01 | 1101 |
| DATA | 10 | 0000 |

(b-2) Information Included in Beacon Frame

In IEEE 802.11, an access point periodically transmits a beacon frame. A station receiving the beacon frame can acquire information regarding the access point. The beacon frame in a wireless LAN can also be said to correspond to system information in a cellular system.

For example, the beacon frame includes a beacon interval. The beacon interval is a time interval of transmission of a beacon. The station can ascertain an approximate time at which a subsequent beacon is transmitted from the beacon interval. The beacon interval can be set with fineness of 10 ms between 20 ms to 1000 ms. For example, the beacon interval is set to 100 ms.

For example, the beacon frame includes a time stamp. The time stamp is information used for time synchronization between the access point and the station.

For example, the beacon frame includes a service set ID. The service set ID in a wireless LAN can also be said to correspond to a cell ID in a cellular system.

Also, for example, the beacon frame includes other information such as a channel and a modulation scheme to be supported.

(b-3) Transmission of Beacon Frame

The access point attempts to transmit the beacon frame at the beacon interval. Even at the time of transmission of the beacon frame, the access point performs carrier sense over the DIFS and waits for the backoff time. Therefore, when channels are exclusively used by other nodes, a time in which the access point transmits the beacon frame is shifted backward. Hereinafter, a specific example of this point will be described with reference to FIG. 2.

Figure 2:
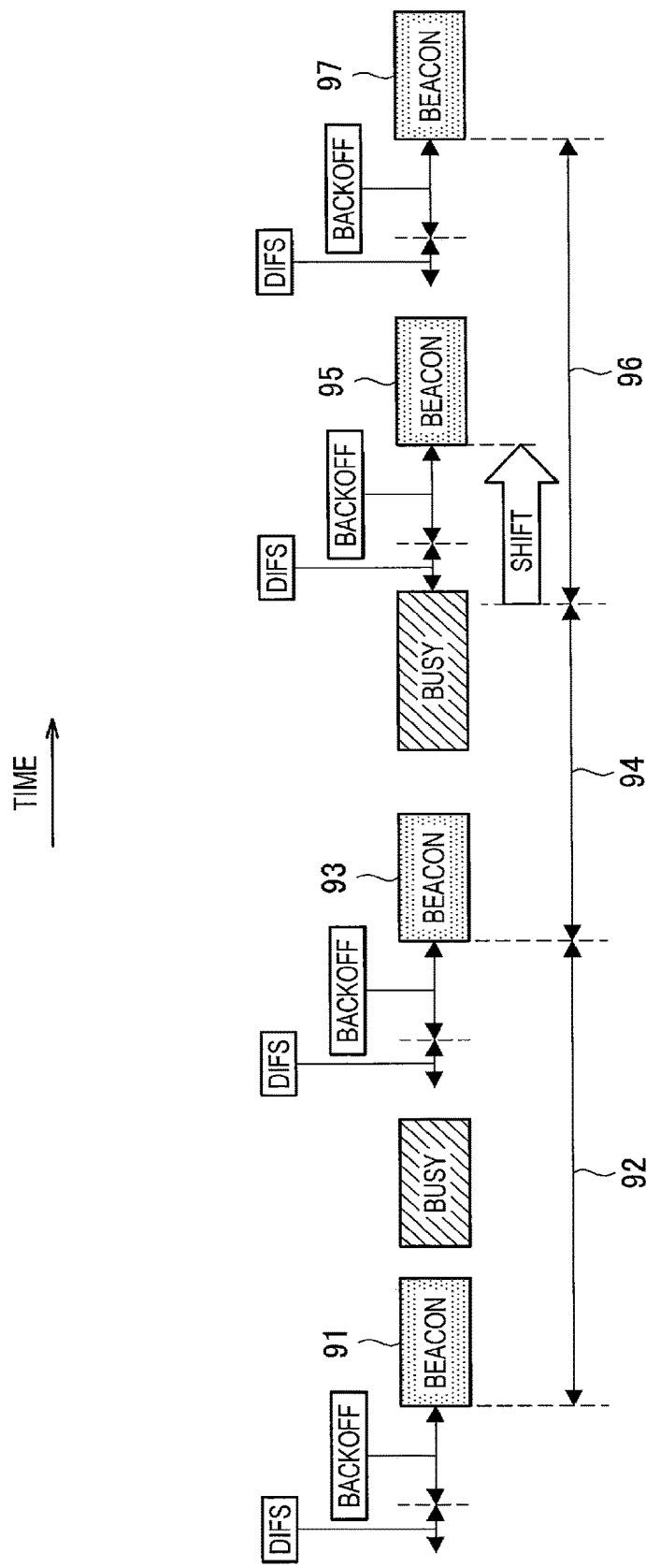
FIG. 2 is an explanatory diagram illustrating an example of beacon transmission according to IEEE 802.11.
Figure 3:
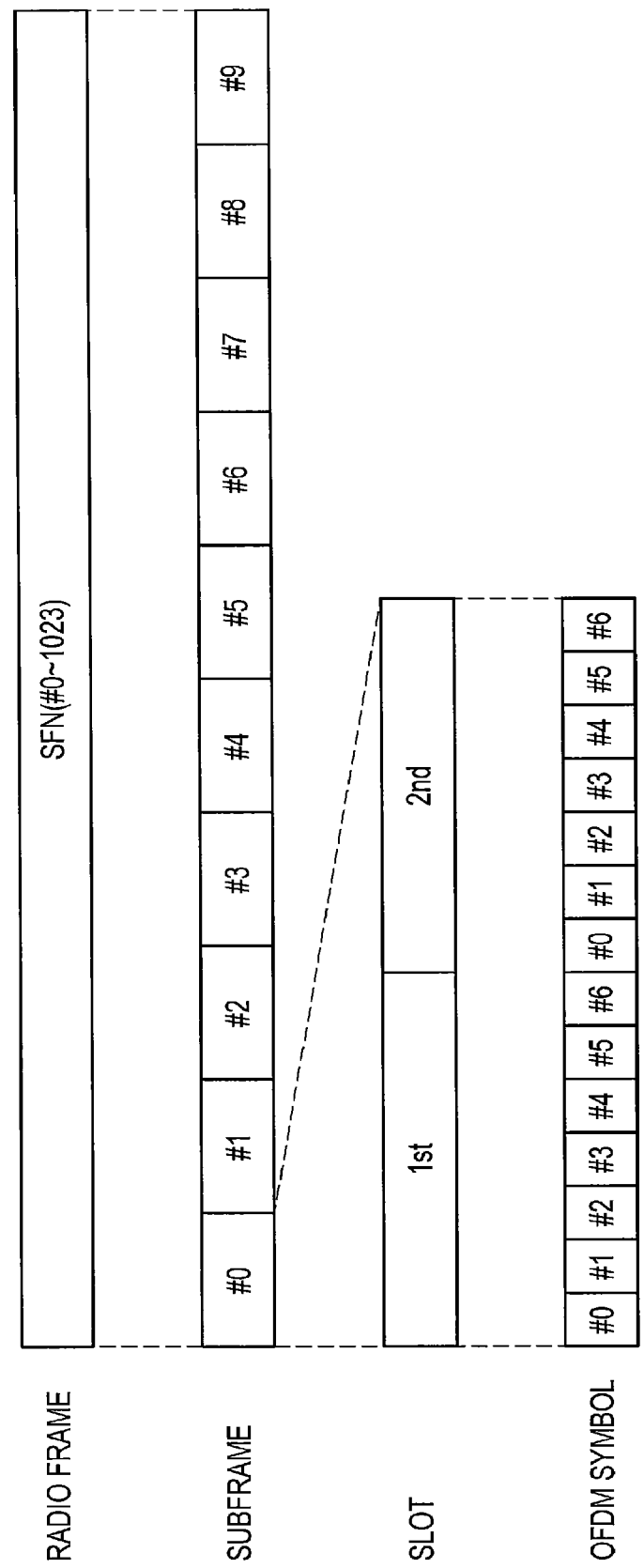
FIG. 3 is an explanatory diagram illustrating a frame format of long-term evolution (LTE).

FIG. 2 is an explanatory diagram illustrating an example of beacon transmission according to IEEE 802.11. For example, after the access point performs carrier sense over the DIFS and waits for the backoff time, the access point transmits the beacon frame 91. Further, the access point transmits a beacon frame 93 after a beacon interval 92 elapses. Thereafter, after a beacon interval 94 elapses, a channel enters a busy state due to transmission of a signal by another node. Therefore, after the busy state ends, the access point performs carrier sense over the DIFS, waits for only the backoff time, and subsequently transmits a beacon frame 95. Thereafter, after a beacon interval 96 elapses, the access point transmits a beacon frame 97.

As described above, the access point performs carrier sense over the DIFS, waits for the backoff time, and subsequently transmits a beacon frame.

(3) Technology Related to Cellular System (a) Frame Format

The frame format of LTE will be described with reference to FIG. 3. FIG. 3 is an explanatory diagram illustrating the frame format of LTE.

First, a unit of time such as a radio frame is used in LTE. One radio frame is 10 ms. Each radio frame is identified by a system frame number (SFN) which is any one of 0 to 1023.

The radio frame includes 10 sub-frames identified by #0 to #9. Each sub-frame is 1 ms. Further, each sub-frame includes two slots and each slot incudes, for example, seven orthogonal frequency division multiplexing (OFDM) symbols. That is, each sub-frame includes 14 OFDM symbols. Also, the frame format illustrated in FIG. 3 is a frame format of a downlink and the frame format of an uplink includes a single carrier frequency division multiple access (SC-FDMA) symbol in place of an OFDM symbol.

(b) Carrier Aggregation (b-1) Component Carriers

With carrier aggregation in Release 10, up to a maximum of five CCs are aggregated for use by user equipment (UE). Each CC is a band with a maximum width of 20 MHz. Carrier aggregation includes a case in which successive CCs in the frequency direction are used, and a case in which separated CCs in the frequency direction are used. With carrier aggregation, the CCs to be used may be set for each UE.

(b-2) PCC and SCC

In carrier aggregation, one of the multiple CCs used by a UE is a special CC. This special CC is called the primary component carrier (PCC). Also, the remaining CCs among the multiple CCs are called secondary component carriers (SCCs). The PCC may be different depending on the UE.

Since the PCC is the most important CC among the multiple CCs, it is desirable for the PCC to be the CC with the most stable communication quality. Note that in actual practice, which CC to treat as the PCC depends on the implementation.

The SCC is added to the PCC. In addition, an existing SCC that has been added may also be removed. Note that changing an SCC is conducted by removing an existing SCC and adding a new SCC.

(b-3) PCC Determination Method and Changing Method

When a UE connection is initially established and the status of the UE goes from Radio Resource Control (RRC) Idle to RRC Connected, the CC that the UE used during the establishment of the connection becomes the PCC for that UE. More specifically, a connection is established through a connection establishment procedure. At this point, the status of the UE goes from RRC Idle to RRC Connected. Also, the CC used in the procedure becomes the PCC for the above UE. Note that the above procedure is a procedure initiated from the UE side.

Additionally, PCC changing is conducted by a handover between frequencies. More specifically, if a handover is specified in a connection reconfiguration procedure, a PCC handover is conducted, and the PCC is changed. Note that the above procedure is a procedure initiated from the network side.

(b-4) Adding SCC

As discussed above, the SCC is added to the PCC. As a result, the SCC is associated with the PCC. In other words, the SCC is subordinate to the PCC. SSC addition may be conducted through a connection reconfiguration procedure. Note that this procedure is a procedure initiated from the network side.

(b-5) Removing SSC

As discussed above, an SCC may be removed. SSC removal may be conducted through a connection reconfiguration procedure. Specifically, a specific SCC specified in a message is removed. Note that the above procedure is a procedure initiated from the network side.

In addition, the removal of all SCCs may be conducted through a connection re-establishment procedure.

(b-6) Special Role of PCC

The connection establishment procedure, the transmitting and receiving of non-access stratum (NAS) signaling, and the transmitting and receiving of uplink control signals on the physical uplink control channel (PUCCH) are conducted only by the PCC, and not by the SCCs.

In addition, the detection of a radio link failure (RLF) and a subsequent connection re-establishment procedure are also conducted only by the PCC, and not by the SCCs.

(b-7) Conditions of Backhauling for Carrier Aggregation

For example, an ACK of a downlink signal on an SCC is transmitted by the PUCCH of the PCC. Since the ACK is used for the retransmission of data by the evolved Node B (eNB), a delay of the ACK is not acceptable. Consequently, when a first eNB using a CC that acts as the PCC for a UE is different from a second eNB using a CC that acts as an SCC for the UE, a backhaul delay of approximately 10 ms between the first eNB and the second eNB is desirable.

«2. Schematic configuration of communication system»

Figure 4:
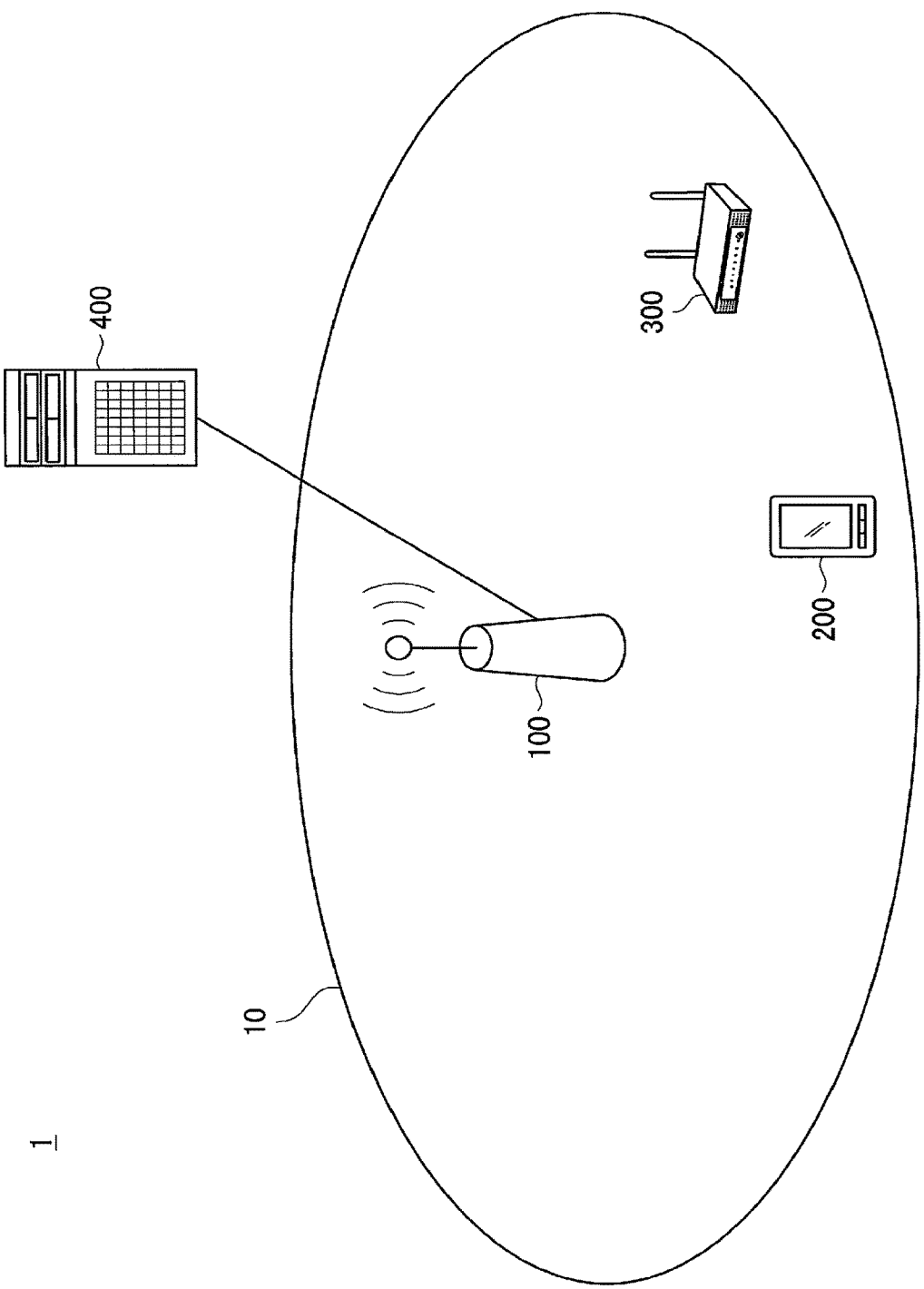
FIG. 4 is an explanatory diagram illustrating an example of a schematic configuration of a system according to an embodiment of the present disclosure.

Next, a schematic configuration of a system 1 according to an embodiment of the present disclosure will be described with reference to FIGS. 4 and 5. FIG. 4 is an explanatory diagram illustrating an example of a schematic configuration of the system 1 according to an embodiment of the present disclosure. Referring to FIG. 4, the system 1 includes a base station 100 and a terminal device 200, an access point 300, and a control device 400.

(1) Base Station 100

The base station 100 is a base station of a cellular system. For example, the cellular system is a system conforming to LTE, LTE-advanced, or a communication standard equivalent thereto. The base station 100 operates according to the communication standard. The base station 100 may be a small cell or a macro cell.

(a) Frequency Band (a-1) Frequency Band for Cellular System

The base station 100 performs wireless communication in a frequency band for the cellular system. For example, the frequency band is a component carrier for the cellular system.

The frequency band for the cellular system is a frequency band included in a licensed band.

(a-2) Shared Band

In particular, in an embodiment of the present disclosure, the base station 100 performs wireless communication in a frequency band (that is, a shared band) shared between the cellular system and a wireless LAN. For example, the shared band is a channel of the wireless LAN. More specifically, for example, the shared band is a channel of a band of 5 GHz (or a band of 2.4 GHz) and has a bandwidth of 20 MHz. Also, the shared band is not limited to this example, but may be a frequency band included in another band such as a band of 3.5 GHz or a band of 60 GHz.

The shared band is a frequency band included in an unlicensed band.

(b) Wireless Communication with Terminal Device

The base station 100 performs wireless communication with a terminal device (for example, the terminal device 200). For example, the base station 100 performs wireless communication with a terminal device located within a cell 10 of the base station 100. More specifically, for example, the base station 100 transmits a downlink signal to the terminal device, and receives an uplink signal from the terminal device.

(2) Terminal Device 200

(a) Wireless Communication in Cellular System

The terminal device 200 is a terminal device that can perform communication in the cellular system. As described above, for example, the cellular system is a system conforming to LTE, LTE-advanced, or a communication standard equivalent thereto. The terminal device 200 operates according to the communication standard.

The terminal device 200 performs wireless communication in the frequency band for the cellular system. Further, for example, the terminal device 200 performs wireless communication in the shared band.

For example, the terminal device 200 performs wireless communication with a base station (for example, the base station 100). For example, when the terminal device 200 is located within a cell of a base station (for example, the cell 10 of the base station 100), the terminal device 200 performs wireless communication with the base station. Specifically, for example, the terminal device 200 receives the downlink signal from the base station and transmits the uplink signal to the base station 100.

(b) Wireless Communication in Wireless LAN

Further, for example, the terminal device 200 is able to perform communication in a wireless LAN. For example, the terminal device 200 operates according to an IEEE 802.11 standard (for example, IEEE 802.11a, 11b, 11g, 11n, 11ac, or 11ad).

For example, the terminal device 200 performs wireless communication with an access point with the shared band or another channel of a wireless LAN. That is, the terminal device 200 operates as a station of the wireless LAN.

(3) Access Point 300

The access point 300 is an access point of a wireless LAN. For example, the access point 300 operates according to an IEEE 802.11 standard (for example, IEEE 802.11a, 11b, 11g, 11n, 11ac, or 11ad).

For example, the access point 300 performs wireless communication with a station of the wireless LAN with the shared band or another channel of the wireless LAN.

(4) Control Device 400

The control device 400 is a device that can communicate with the base station 100. For example, the control device 400 can control wireless communication of the base station 100.

The control device 400 may be a core network node or may be an access network node.

(5) Use of Shared Band in Cellular System (a) Exclusive Use and Release of Shared Band For example, the base station 100 exclusively uses the shared band over a predetermined time and subsequently releases the shared band. That is, the base station 100 performs wireless communication in the shared band over the predetermined time and subsequently stops the wireless communication in the shared band. For example, the base station 100 releases the shared band over a period of the same length as the predetermined period (that is, stops the wireless communication in the shared band). Thus, the shared band can be shared fairly between the cellular system and the wireless LAN.

Figure 5:
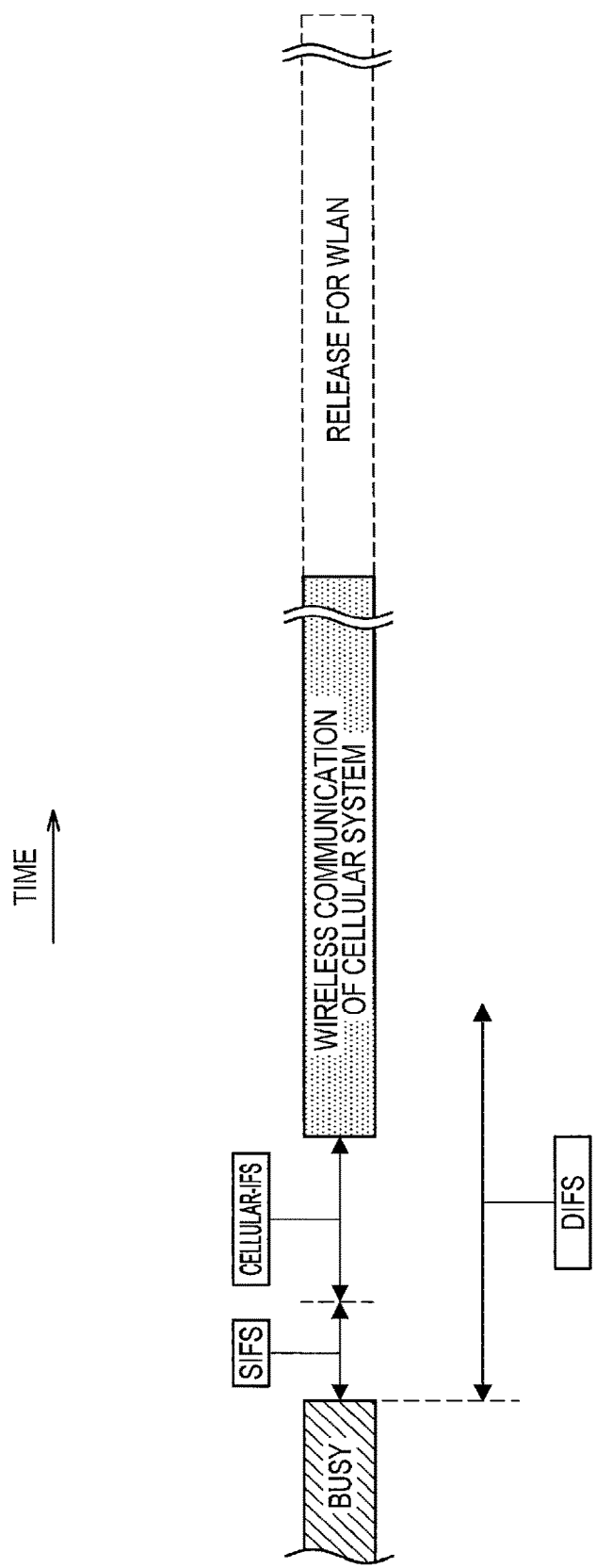
FIG. 5 is an explanatory diagram illustrating an example of exclusive use and release of a shared band in a cellular system.

FIG. 5 is an explanatory diagram illustrating an example of exclusive use and release of the shared band in a cellular system. Referring to FIG. 5, for example, the base station 100 waits for a short interframe space (SIFS) and a cellular IFS (that is, IFS for the cellular system) after ending of a busy state of the shared band and performs wireless communication (wireless communication of the cellular system) in the shared band over a predetermined period. Thereafter, the base station 100 stops the wireless communication in the shared band, for example, over a period of the same length as the predetermined period (that is, releases the shared band for the wireless LAN). For example, the SIFS is 1 us, the cellular IFS is 10 us, and the DIFS is 34 us. Therefore, after the ending of the busy state of the shared band, the base station 100 can transmit a signal earlier than a node of the wireless LAN.

Also, for example, the predetermined period is a period that has a length of an integer multiple of 10 ms. That is, the predetermined period is a period that has a period of an integer multiple of a radio frame. Thus, for example, the base station 100 can perform wireless communication at least in units of radio frames. As an example, the predetermined period is 10.24 seconds (that is, 10240 ms) which is a period of a system frame number (SFN). Thus, for example, the base station 100 can perform wireless communication in the shared band over one period of the SFN.

(b) Carrier Aggregation

For example, the shared band is used as a component carrier in the cellular system. For example, a periodicity band for the cellular system is used as a primary component carrier (PCC) or a secondary component carrier (SCC) in a terminal device, and the shared band is used as the SCC in the terminal device.

Further, for example, the periodicity band for the cellular system is used to transmit a control signal and the shared band is used to transmit a data signal. Also, the shared band can be used as a downlink dedicated frequency band.

«3. Configuration of each device»

Next, an example of the configuration of each device will be described with reference to FIGS. 6 to 9.

<3.1. Configuration of Base Station>

Figure 6:
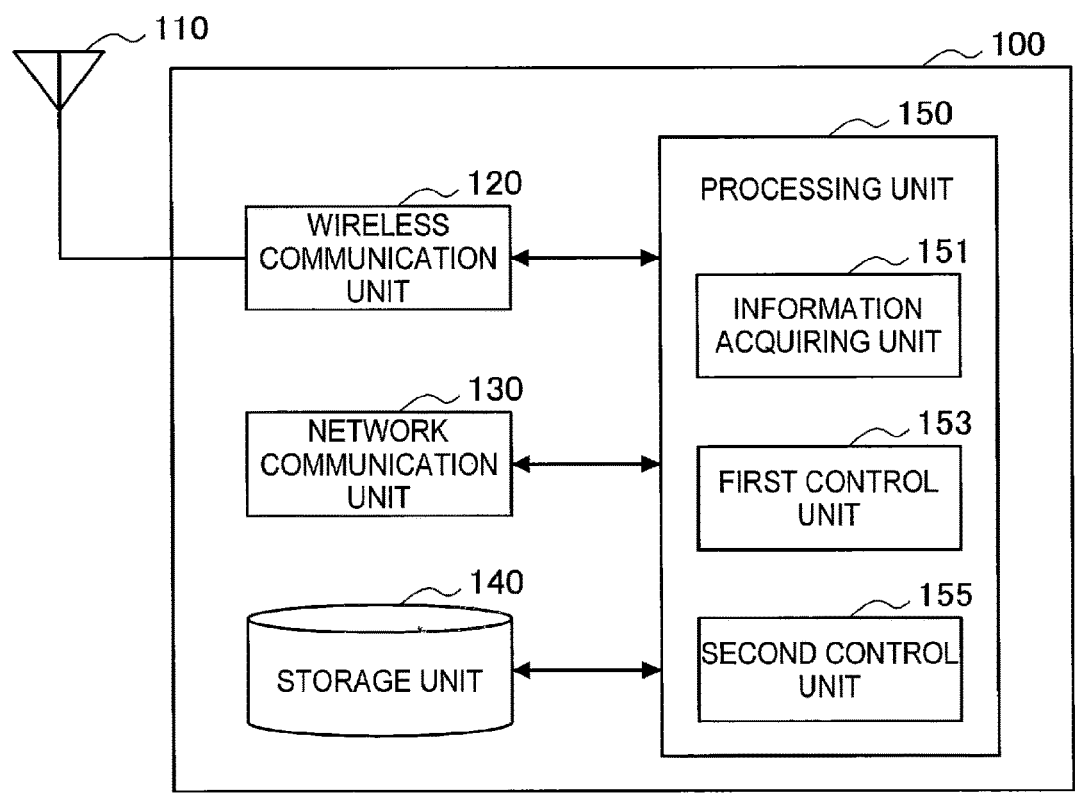
FIG. 6 is a block diagram illustrating an example of a configuration of a base station according to the embodiment.

Next, an example of the configuration of a base station 100 according to an embodiment of the present disclosure will be described with reference to FIG. 6. FIG. 6 is a block diagram illustrating an example of the configuration of the base station 100 according to an embodiment of the present disclosure. Referring to FIG. 6, the base station 100 is equipped with an antenna unit 110, a wireless communication unit 120, a network communication unit 130, a storage unit 140, and a processing unit 150.

(1) Antenna Unit 110

The antenna unit 110 emits a signal output by the wireless communication unit 120 into space as a radio wave. Additionally, the antenna unit 110 converts a radio wave from space into a signal, and outputs the signal to the wireless communication unit 120.

(2) Wireless Communication Unit 120

The wireless communication unit 120 transmits and receives signals. For example, the wireless communication unit 120 transmits and receives signals with a frequency band for the cellular system and/or a frequency band (that is, the shared band) shared between the cellular system and the wireless LAN.

(3) Network Communication Unit 130

The network communication unit 130 performs transmission and reception of information. For example, the network communication unit 130 transmits information to another node, and receives information from another node. For example, the other node includes another base station and a core network node. The other node further can further include the control device 400.

(4) Storage Unit 140

The storage unit 140 temporarily or permanently stores programs and data for the operation of the base station 100.

(5) Processing Unit 150

The processing unit 150 provides various functions of the base station 100. The processing unit 150 includes an information acquiring unit 151, a first control unit 153, and a second control unit 155. The processing unit 150 may further include any other component in addition to these components. In other words, the processing unit 150 can perform an operation other than operations of these components.

Operations of the information acquiring unit 151, the first control unit 153, and the second control unit 155 will be described in detail below.

<3.2. Configuration of Terminal Device>

Figure 7:
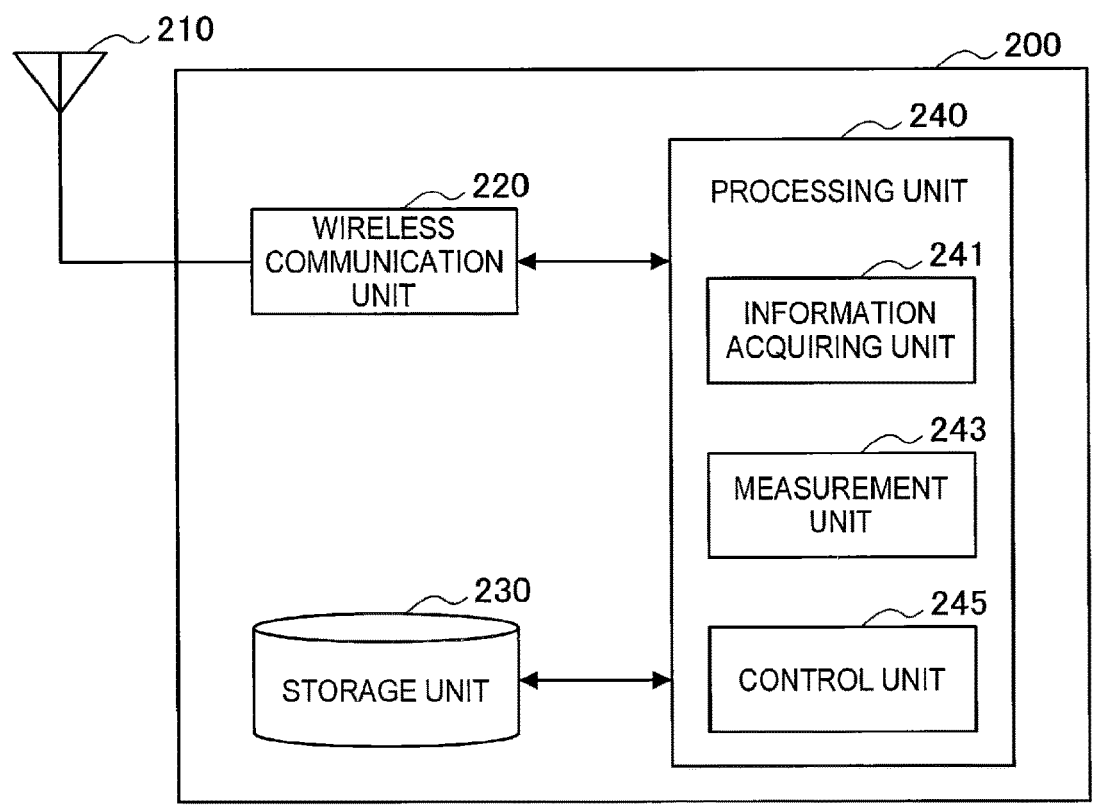
FIG. 7 is a block diagram illustrating an example of a configuration of a terminal device according to the embodiment.

Next, an example of the configuration of terminal device 200 according to an embodiment of the present disclosure will be described with reference to FIG. 7. FIG. 7 is a block diagram illustrating an example of the configuration of the terminal device 200 according to an embodiment of the present disclosure. Referring to FIG. 7, the terminal device 200 is equipped with an antenna unit 210, a wireless communication unit 220, a storage unit 230, and a processing unit 240.

(1) Antenna Unit 210

The antenna unit 210 emits a signal output by the wireless communication unit 220 into space as a radio wave. Additionally, the antenna unit 210 converts a radio wave from space into a signal, and outputs the signal to the wireless communication unit 220.

(2) Wireless Communication Unit 220

The wireless communication unit 220 transmits and receives signals. For example, the wireless communication unit 220 transmits and receives signals with a frequency band for the cellular system and/or a frequency band (that is, the shared band) shared between the cellular system and the wireless LAN.

(3) Storage Unit 230

The storage unit 230 temporarily or permanently stores programs and data for the operation of the terminal device 200.

(4) Processing Unit 240

The processing unit 240 provides various functions of the terminal device 200. The processing unit 240 includes an information acquiring unit 241, a measurement unit 243, and a control unit 245. The processing unit 240 may further include any other component in addition to these components. In other words, the processing unit 240 can perform an operation other than operations of these components.

Operations of the information acquiring unit 241, the measurement unit 243, and the control unit 245 will be described in detail below.

<3.3. Configuration of Access Point>

Figure 8:
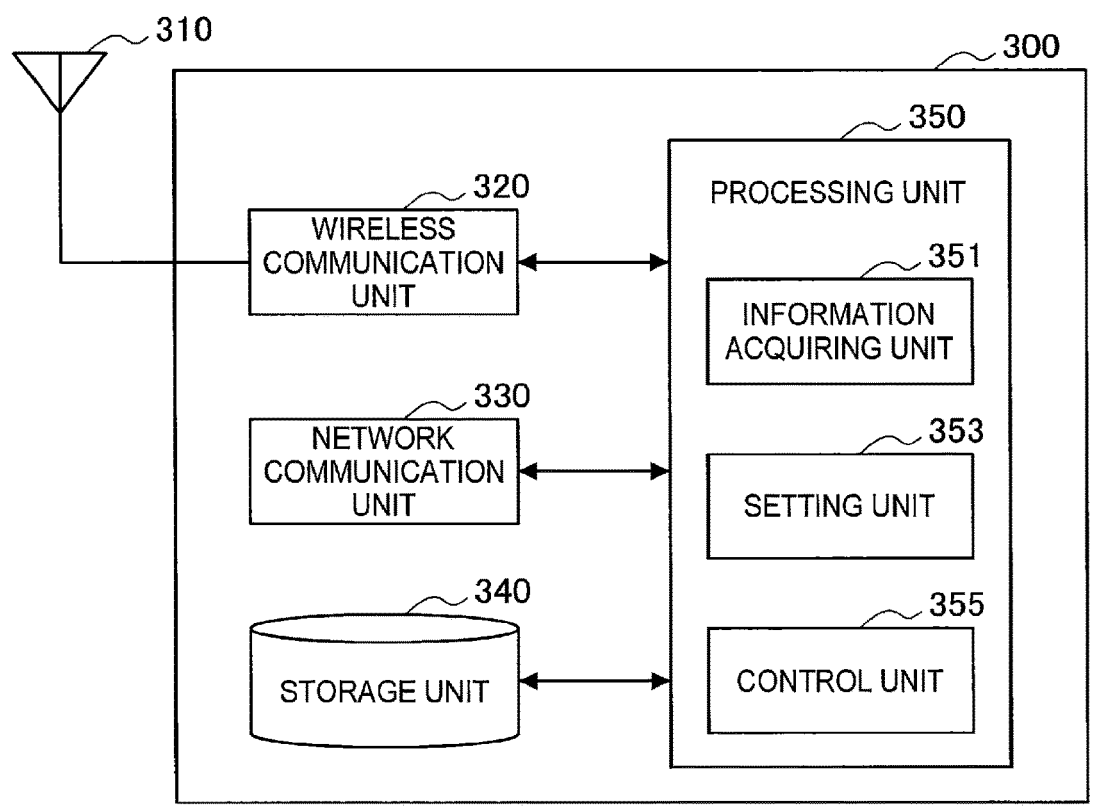
FIG. 8 is a block diagram illustrating an example of a configuration of an access point according to the embodiment.

Next, an example of the configuration of the access point 300 according to an embodiment of the present disclosure will be described with reference to FIG. 8. FIG. 8 is a block diagram illustrating an example of the configuration of the access point 300 according to an embodiment of the present disclosure. Referring to FIG. 8, the access point 300 is equipped with an antenna unit 310, a wireless communication unit 320, a network communication unit 330, a storage unit 340, and a processing unit 350.

(1) Antenna Unit 310

The antenna unit 310 emits a signal output by the wireless communication unit 320 into space as a radio wave. Additionally, the antenna unit 310 converts a radio wave from space into a signal, and outputs the signal to the wireless communication unit 320.

(2) Wireless Communication Unit 320

The wireless communication unit 320 transmits and receives signals. For example, the wireless communication unit 320 transmits and receives signals with a frequency band (that is, the shared band) shared between the cellular system and the wireless LAN. The wireless communication unit 320 may transmit and receive signals with still another frequency band (a channel of the wireless LAN).

(3) Network Communication Unit 330

The network communication unit 330 performs transmission and reception of information. For example, the network communication unit 330 transmits information to another node, and receives information from another node.

(4) Storage Unit 340

The storage unit 140 temporarily or permanently stores programs and data for the operation of the access point 300.

(5) Processing Unit 350

The processing unit 350 provides various functions of the access point 300. The processing unit 350 includes an information acquiring unit 351 and a communication processing unit 353. The processing unit 350 may further include any other component in addition to these components. In other words, the processing unit 350 can perform an operation other than operations of these components.

Operations of the information acquiring unit 351, the setting unit 353, and the control unit 355 will be described in detail below.

<3.4. Configuration of Control Device>

Figure 9:
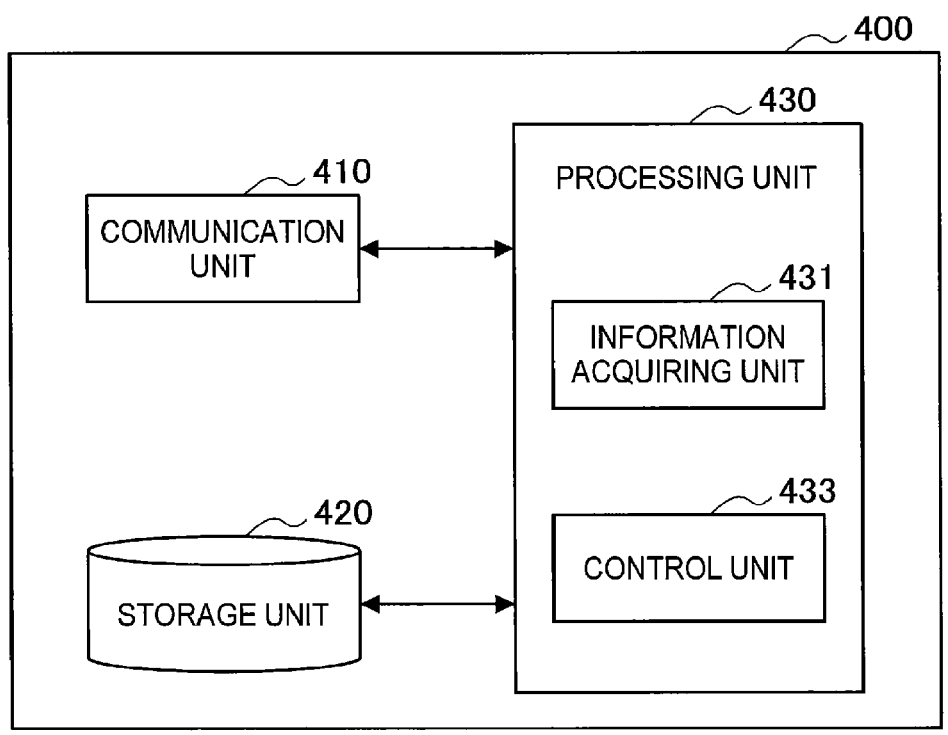
FIG. 9 is a block diagram illustrating an example of a configuration of a control device according to the embodiment.

Next, an example of the configuration of the control device 400 according to the embodiment of the present disclosure will be described with reference to FIG. 9. FIG. 9 is a block diagram illustrating an example of the configuration of the control device 400 according to the embodiment of the present disclosure. Referring to FIG. 9, the control device 400 includes a communication unit 410, a storage unit 420, and a processing unit 430.

(1) Communication Unit 410

The communication unit 410 transmits and receives information. For example, the communication unit 410 transmits information to another node and receives information from the other node. For example, the other node includes the base station 100.

(2) Storage Unit 420

The storage unit 420 temporarily or permanently stores a program and data for an operation of the control device 400.

(3) Processing Unit 430

The processing unit 430 supplies various functions of the control device 400. The processing unit 430 includes an information acquiring unit 431 and a control unit 433. Also, the processing unit 430 may further include other constituent elements in addition to these constituent elements. That is, the processing unit 430 can also perform operations in addition to operations of these constituent elements.

Operations of the information acquiring unit 431 and the control unit 433 will be described in detail below.

«4. Technical Features»

Next, technical features according to an embodiment of the present disclosure will be described with reference to FIGS. 10 to 16.

(1) Stop of Wireless Communication of Base Station 100

The base station 100 stops wireless communication in a shared band (a frequency band shared between the cellular system and the wireless LAN) over a period prepared at a beacon interval of the wireless LAN (hereinafter referred to as a "stop period").

The information acquiring unit 151 acquires information indicating the stop period. The first control unit 153 stops the wireless communication of the base station 100 in the shared band over the stop period.

(a) Beacon Interval

For example, the beacon interval is decided in the cellular system and is an interval of which the access point of the wireless LAN is notified by the cellular system.

For example, the base station 100 decides the beacon interval. Alternatively, another base station (for example, an adjacent base station to the base station 100 or a representative base station of the plurality of base stations 100) of the cellular system may decide the beacon interval. Alternatively, the control device 400 may decide the beacon interval.

For example, the beacon interval is one between 20 ms to 1000 ms. For example, the beacon interval is 100 ms (that is, 10 radio frames).

(b) Stop Period

For example, the stop period is a period prepared at the beacon interval in order for the access point of the wireless LAN to transmit the beacon frame. That is, the base station 100 stops the wireless communication in the shared band over the stop period in order for the access point of the wireless LAN to transmit the beacon frame.

For example, the stop period is one or more subframes. As an example, the stop period is one subframe. This is because the beacon frame typically has the length of about 1 ms.

For example, the stop period does not include a subframe in which a synchronization signal is transmitted in a radio frame of the base station 100 in the shared band. For example, in the radio frame, the synchronization signal is transmitted in the subframes of which subframe numbers are 0 and 5 and the stop period does not include these subframes. Thus, for example, it is possible to continuously transmit the synchronization signal. As a result, for example, the terminal device can continuously maintain synchronization.

Figure 10:
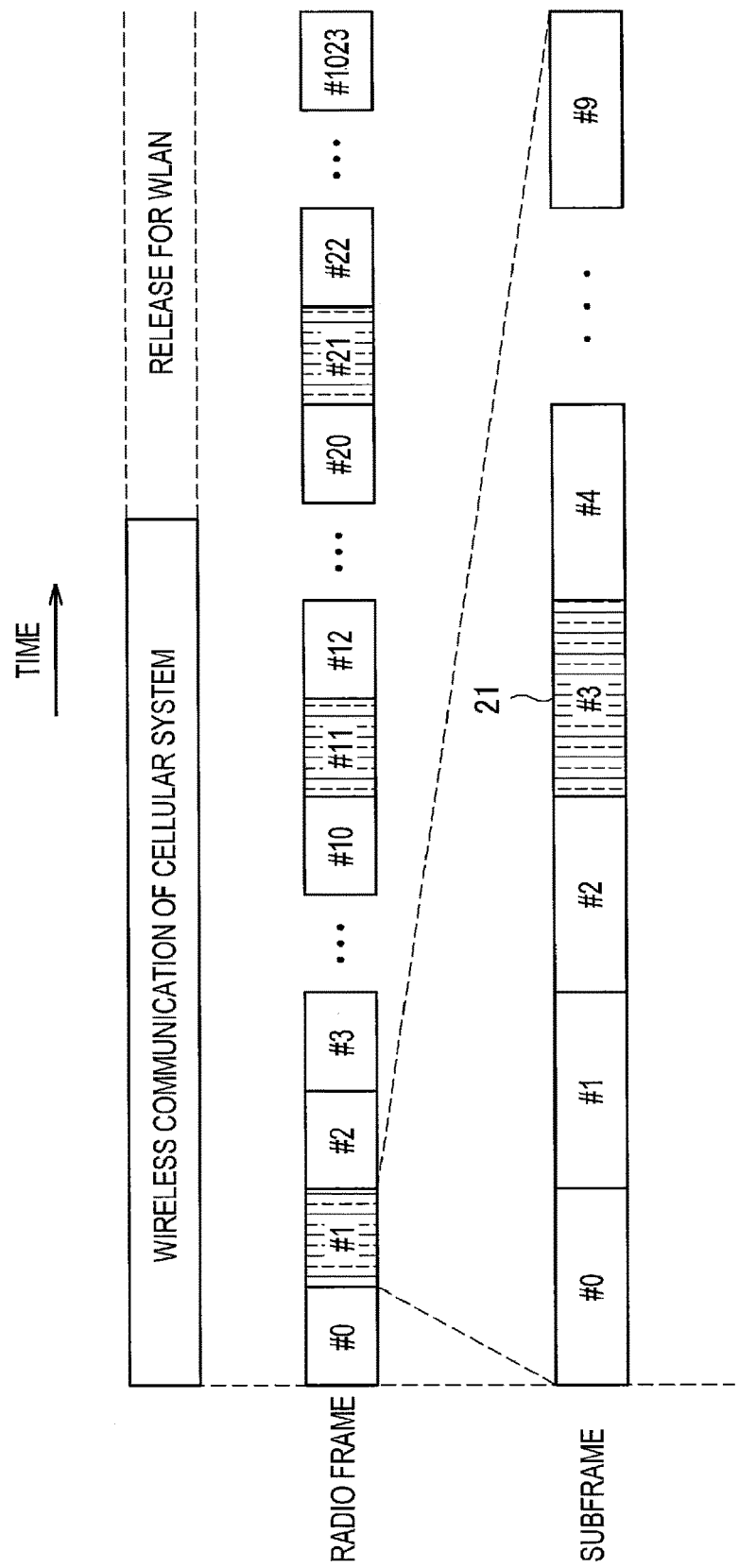
FIG. 10 is an explanatory diagram illustrating an example of a stop period.

FIG. 10 is an explanatory diagram illustrating an example of a stop period. Referring to FIG. 10, for example, the base station 100 performs wireless communication in the shared band over 1024 radio frames. In this example, the beacon interval is 100 ms (that is, 10 radio frames) and the stop period 21 is one subframe. More specifically, the stop period 21 is a subframe of which a subframe number is 3 among radio frames with the SFN which has a remainder of 1 when the SFN is divided by 10. The base station 100 stops the wireless communication in the shared band over the subframe.

(c) Shared Band (c-1) Example of Shared Band

For example, the shared band is the channel of the wireless LAN. More specifically, for example, the shared band is a channel of a band of 5 GHz (or a band of 2.4 GHz) and has a bandwidth of 20 MHz.

Also, the shared band is not limited to this example and may be a frequency band included in another band such as a band of 3.5 GHz or a band of 60 GHz.

(c-2) Use as CC

For example, the base station 100 uses the shared band as a component carrier (CC). More specifically, for example, the base station 100 uses the shared band as a secondary component carrier (SCC) of the terminal device.

(c-3) Downlink Dedicated Frequency Band

The base station 100 uses the shared band as a downlink dedicated frequency band. That is, the base station 100 can perform only transmission of a downlink signal in the shared band.

(d) Stop of Wireless Communication

As a first example, the first control unit 153 allocates the radio resources of the shared band to the terminal device. In this case, the first control unit 153 does not allocate the radio resources of the shared band in the stop period to any terminal device.

As a second example, the first control unit 153 performs a reception process (demapping of signals from radio resources, demodulating, decoding, and the like) and a transmission process (encoding, modulating, and mapping of signals to radio resources, and the like) for transmission in the shared band. In this case, the first control unit 153 does not perform a reception process for reception for the stop period and a transmission process for transmission for the stop period.

As a third example, the first control unit 153 may switch an ON/OFF state of the wireless communication in the shared band. In this case, the first control unit 153 may cause the wireless communication in the shared band to enter the OFF state over the stop period.

For example, through such an operation, the base station 100 stops the wireless communication in the shared band over the stop period.

As described above, the base station 100 stops the wireless communication in the shared band over the stop period.

Thus, for example, it is possible to protect a beacon transmitted by the access point of the wireless LAN in the shared band. Therefore, for example, it is possible to avoid a situation in which a station of the wireless LAN searches for an access point for a long time.

(2) Notification of Beacon Interval to Access Point 300

For example, the base station 100 (the first control unit 153) notifies the access point 300 of the beacon interval.

(a) First Example: Notification via Terminal Device (a-1) Operation of Base Station 100

As a first example, the base station 100 (the first control unit 153) notifies the access point 300 of the beacon interval by transmitting information indicating the beacon interval (hereinafter referred to as "beacon interval information") to the terminal device 200 capable of performing communication in both the cellular system and the wireless LAN. That is, the base station 100 notifies the access point 300 of the beacon interval via the terminal device 200.

For example, the base station 100 (the first control unit 153) transmits system information including the beacon interval information. Also, the base station 100 (the first control unit 153) may individually transmit a message including the beacon interval information to the terminal device 200.

As a specific process, for example, the first control unit 153 performs a transmission process (for example, generating, scheduling, mapping to radio resources, encoding, and/or modulating of the system information or the message) for the beacon interval information.

(a-2) Operation of Terminal Device 200

For example, the terminal device 200 (the information acquiring unit 241) acquires the beacon interval information. Then, for example, the terminal device 200 (the control unit 245) transmits the wireless LAN frame including the beacon interval information to the access point 300.

As an example, the wireless LAN frame is a data frame.

As a specific process, for example, the control unit 245 performs a transmission process (for example, generating, encoding, and/or demodulating of the wireless LAN frame) for the wireless LAN frame.

(b) Second Example: Notification to Access Point Able to Perform Communication in Cellular System As a second example, the access point 300 may be able to perform communication in the cellular system. In this case, the base station 100 (the first control unit 153) may notify the access point 300 of the beacon interval by transmitting the beacon interval information to the access point 300. That is, the base station 100 may directly notify the access point 300 of the beacon interval according to a communication scheme of the cellular system.

The base station 100 (the first control unit 153) may transmit the system information including the beacon interval information. Also, the base station 100 (the first control unit 153) may individually transmit a message including the beacon interval information to the access point 300.

As a specific operation, the first control unit 153 may perform a transmission process (for example, generating, scheduling, mapping to radio resources, encoding, and/or modulating of the system information or the message) for the beacon interval information.

(c) Third Example: Notification with Wireless LAN Frame

As a third example, the base station 100 (the first control unit 153) may notify the access point 300 of the beacon interval by transmitting the wireless LAN frame including the beacon interval information. That is, the base station 100 may directly notify the access point 300 of the beacon interval according to the communication scheme of the wireless LAN.

As an example, the wireless LAN frame may be a data frame.

As a specific operation, the first control unit 153 may perform a transmission process (for example, generating, encoding, and/or demodulating of the wireless LAN frame) for the wireless LAN frame.

(d) Fourth Example: Notification via Backhauling

As a fourth example, the base station 100 (the second control unit 155) may notify the access point 300 of the beacon interval information by transmitting the beacon interval information to the access point 300 via backhauling.

As a specific operation, the second control unit 155 may perform a transmission process (for example, generating and/or encoding of the message) for the message including the beacon interval information.

For example, as described above, the base station 100 (the first control unit 153) notifies the access point 300 of the beacon interval. Thus, for example, the access point 300 can match the beacon interval with a time interval at which the beacon frame can actually be transmitted. Therefore, for example, it is possible to avoid a situation in which a beacon may not be received even when a station of the wireless LAN is activated at the beacon interval.

(3) Transmission of Beacon Frame by Access Point 300

The access point 300 sets the beacon interval which is decided in the cellular system and of which the access point 300 is notified by the cellular system, as a beacon interval for the access point 300.

The information acquiring unit 351 acquires information indicating the beacon interval (that is, the beacon interval information) and the setting unit 353 sets the beacon interval as the beacon interval for the access point 300.

For example, the access point 300 (the control unit 355) transmits the beacon frame in the shared band according to the set beacon interval. Specifically, for example, the access point 300 (the control unit 355) attempts to transmit the beacon frame in the shared band at the set beacon interval based on a result of carrier sense of the shared band. Hereinafter, an example of transmission of the beacon frame will be described with reference to FIG. 11.

Figure 11:
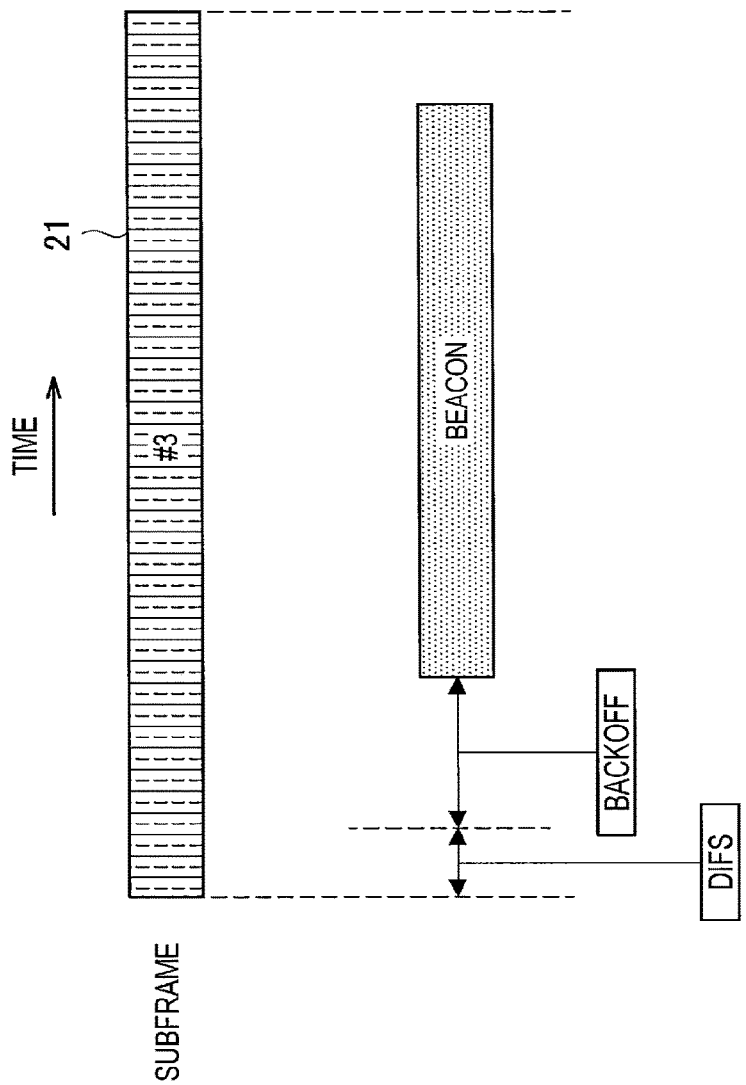
FIG. 11 is an explanatory diagram illustrating an example of transmission of a beacon frame.

FIG. 11 is an explanatory diagram illustrating an example of transmission of the beacon frame. Referring to FIG. 11, the stop period 21 (subframe) described with reference to FIG. 10 is illustrated. Since the base station 100 performs wireless communication in the shared band until ending of the subframe with subframe number #2, the shred band is in a busy state. Therefore, as the result of the carrier sense, the access point 300 does not transmit the beacon frame until the ending of the subframe. Thereafter, in the subframe with subframe number #3 (that is, the stop period 21), the base station 100 stops the wireless communication in the shared band. The access point 300 performs the carrier sense from a starting time point of the subframe with subframe number #3 to the DIF S and waits for a backoff time. Then, the access point 300 transmits the beacon frame in the shared band.

In this way, although the access point 300 does not ascertain the stop period, the access point 300 transmits the beacon frame within the stop period through the carrier sense or the like when the access point 300 transmits the beacon frame at the beacon interval. That is, the beacon frame is guided to the stop period.

(4) Operation for Terminal Device
(a) First Example: Notification of Stop Period
(a-1) Operation of Base Station For example, the base station 100 (the first control unit 153) transmits information indicating the stop period (hereinafter referred to as "stop period information") to a terminal device 200.

For example, the base station 100 (the first control unit 153) transmits system information including the stop period information. Also, the base station 100 (the first control unit 153) may individually transmit a message including the stop period information to the terminal device 200.

As a specific operation, for example, the first control unit 153 performs a transmission process (for example, generating, scheduling, mapping to radio resources, encoding, and/or modulating of the system information or the message) for the stop period information.

Also, for example, the stop period information includes the beacon interval information. As an example, the stop period information indicates the beacon interval and a start timing (for example, offset) of the stop period. In this case, the base station 100 may transmit the beacon interval information to the terminal device 200 by transmitting the stop period information to the terminal device 200. That is, the transmission of the beacon interval information may be included in the transmission of the stop period information.

(a-2) Operation of Terminal Device

For example, the terminal device 200 performs measurement on the shared band based on the stop period information.

For example, the information acquiring unit 241 acquires the stop period information and the measurement unit 243 performs measurement on the shared band based on the stop period information. Specifically, for example, the measurement unit 243 performs measurement on the shared band using a signal (for example, a reference signal) transmitted in the shared band in a period other than the stop period.

For example, the measurement includes measurement of a channel state of the shared band. More specifically, for example, the measurement includes measurement of channel quality indicators (CQI), precoding matrix indicators (PMI), precoding type indicators (PTI) and/or rank indicators (RI).

For example, the measurement includes measurement of reception power and/or reception quality of a reference signal (for example, a cell-specific reference signal (CRS)) transmitted in the shared band. More specifically, for example, the measurement includes measurement of reference signal received power (RSRP) and/or reference signal received quality (RSRQ).

Thus, for example, the base station 100 stops the wireless communication in the shared band. As a result, the terminal device 200 can appropriately perform measurement even when a signal (for example, a reference signal) of the cellular system in the shared band is not transmitted.

(b) Second Example: Use of Stop Period as MBSFN Subframe

The stop period may be one or more subframes and the base station 100 (the first control unit 153) may use each of the one or more subframes as a multimedia broadcast multicast service (MBMS) over single frequency network (MBSFN) subframe.

As an example, the base station 100 (the first control unit 153) may transmit system information (for example, SIB2) indicating the one or more subframes as MBSFN subframes.

Thus, for example, the base station 100 stops the wireless communication in the shared band. As a result, the terminal device 200 can appropriately perform measurement even when the signal (for example, the reference signal) of the cellular system in the shared band is not transmitted.

(5) Coordination Between Base Stations

For example, the stop period is a common stop period between the base station 100 and an adjacent base station to the base station 100. That is, the base station 100 stops the wireless communication in the shared band over the stop period and the adjacent base station also stops the wireless communication in the shared band over the stop period.

Thus, for example, it is possible to more reliably protect the beacon transmitted by the access point located between the base station 100 and the adjacent base station to the base station 100.

(a) First Example: Coordination by Base Station

For example, the base station 100 (the second control unit 155) transmits the information indicating the stop period (that is, the stop period information) to the adjacent base station. As a result, for example, the adjacent base station stops the wireless communication in the shared band over the stop period.

Alternatively, for example, the adjacent base station transmits the stop period information to the base station 100, and the base station 100 (the second control unit 155) receives the stop period information from the adjacent base station. As a result, for example, the base station 100 stops the wireless communication in the shared band over the stop period.

(b) Second Example: Coordination by Control Device

The control device 400 (the control unit 433) may stop the wireless communication of the base station 100 in the shared band over the stop period. Specifically, the control device 400 (the control unit 433) may stop the wireless communication of the base station 100 in the shared band over the stop period by transmitting the information indicating the stop period (that is, the stop period information) to the base station 100. In this case, the control device 400 may decide the stop period (and the beacon interval).

Also, the base station 100 receiving the stop period information may stop the wireless communication in the shared band over the stop period.

Further, the control device 400 (the control unit 433) may stop the wireless communication of the plurality of base station in the shared band over the stop period by transmitting the stop period information to the plurality of base stations (for example, the base station 100 and the adjacent base station to the base station 100) of the cellular system.

Also, the plurality of base stations (for example, the base station 100 and the adjacent base station to the base station 100) receiving the stop period information may stop the wireless communication in the shared band over the stop period.

(6) Operation for Stop Period
(a) Transmission of Busy Signal

For example, the base station 100 (the first control unit 153) transmits a busy signal for prevent a node of a wireless LAN from transmitting a signal according to a detection result of a beacon frame in the shared band within the stop period.

(a-1) Example of Transmission of Busy Signal
First Example

For example, when the beacon frame is not detected in the shared band before a predetermined timing within the stop period, the base station 100 (the first control unit 153) transmits the busy signal in the shared band over a period after the predetermined timing in the stop period. Hereinafter, a specific example of this point will be described with reference to FIG. 12.

Figure 12:
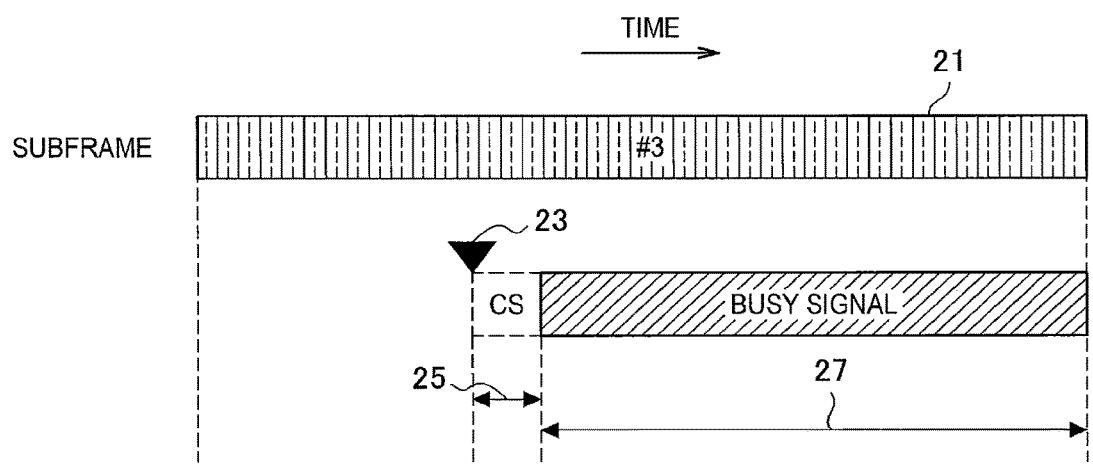
FIG. 12 is an explanatory diagram illustrating a first example of transmission of a busy signal.

FIG. 12 is an explanatory diagram illustrating a first example of transmission of the busy signal. Referring to FIG. 12, the stop period 21 (subframe) described with reference to FIG. 10 is illustrated. When the beacon frame is not detected in the shared band before a predetermined timing 23 (for example, after 0.3 ms from starting of the stop period 21) in the stop period 21, the base station 100 performs carrier sense on the shared band over a time 25 (for example, a cellular IFS shorter than the DIFS). When a signal is not detected in the carrier sense, the base station 100 transmits the busy signal in the shared band over a period 27 (a period from elapse of the time 25 from the predetermined timing 23 to an ending time point of the stop period 21).

Thus, for example, when the beacon frame is not transmitted in the shared band, it is possible to prevent the node of the wireless LAN from transmitting a signal in the shared band. In addition, for example, it is possible to reduce a possibility of the beacon frame extending out of the stop period due to delay of transmission of the beacon frame.
Second Example For example, when the beacon frame is detected in the shared band within the stop period, the base station 100 (the first control unit 153) transmits the busy signal in the shared band over a period after the ending of the beacon frame in the stop period. Hereinafter, a specific example of this point will be described with reference to FIG. 13.

Figure 13:
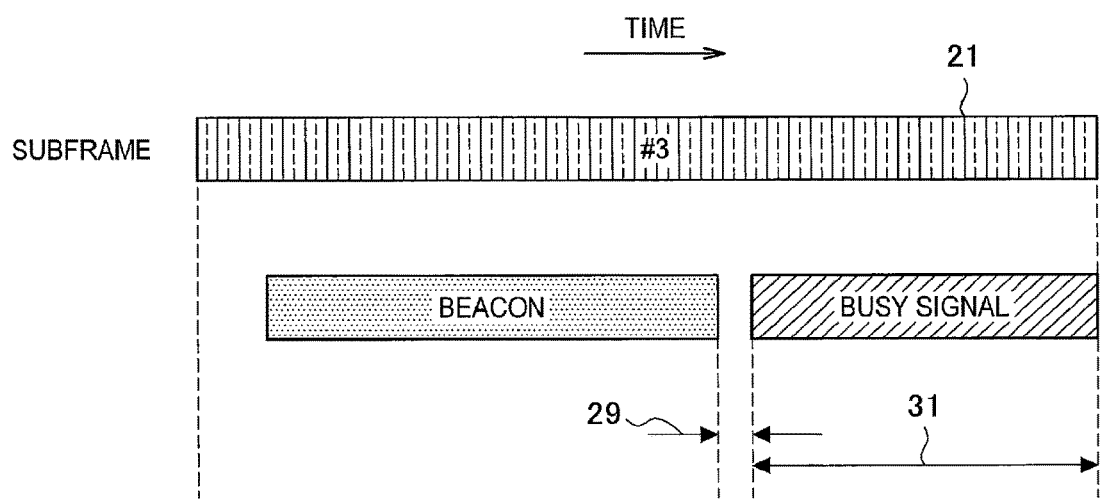
FIG. 13 is an explanatory diagram illustrating a second example of transmission of a busy signal.

FIG. 13 is an explanatory diagram illustrating the second example of transmission of the busy signal. Referring to FIG. 13, the stop period 21 (subframe) described with reference to FIG. 10 is illustrated. The base station 100 detects the beacon frame and performs carrier sense on the shared band over a time 29 (for example, a cellular IFS shorter than the DIFS) after the ending of the beacon frame. When a signal is not detected in the carrier sense, the base station 100 transmits the busy signal in the shared band over a period 31 (a period from elapse of the time 29 from an ending time point of the beacon frame to the ending time point of the stop period 21).

Thus, for example, it is possible to prevent the node of the wireless LAN from transmitting a signal in the shared band after the beacon frame in the shared band is transmitted.
(a-2) Operation of Base station 100
Detection of Beacon Frame For example, the base station 100 (for example, the first control unit 153) detects the beacon frame. Specifically, for example, the base station 100 (for example, the first control unit 153) detects the beacon frame through, for example, preamble detection using a correlator or detection based on a received signal strength indicator (RSSI).
Transmission of Busy Signal As described above, for example, the base station 100 (for example, the first control unit 153) transmits the busy signal in the shared band. For example, the first control unit 153 performs a process of generating the busy signal as a specific operation.
(b) Stop of Wireless Communication for Additional Period For example, when the wireless LAN frame transmitted in the shared band within the stop period does not end within the stop period, the base station 100 further stops the wireless communication in the shared band over an additional stop period continued from the stop period. When the wireless LAN frame does not end within the stop period, the first control unit 153 further stops the wireless communication of the base station 100 in the shared band over the stop period.

More specifically, for example, a signal is continuously detected in the shared band without interruption over at least a predetermined time (for example, a cellular IFS) from any time point of the stop period to an ending time point of the stop period. In this case, the base station 100 further stops the wireless communication in the shared band over the additional stop period. Hereinafter, a specific example of this point will be described with reference to FIG. 14.

Figure 14:
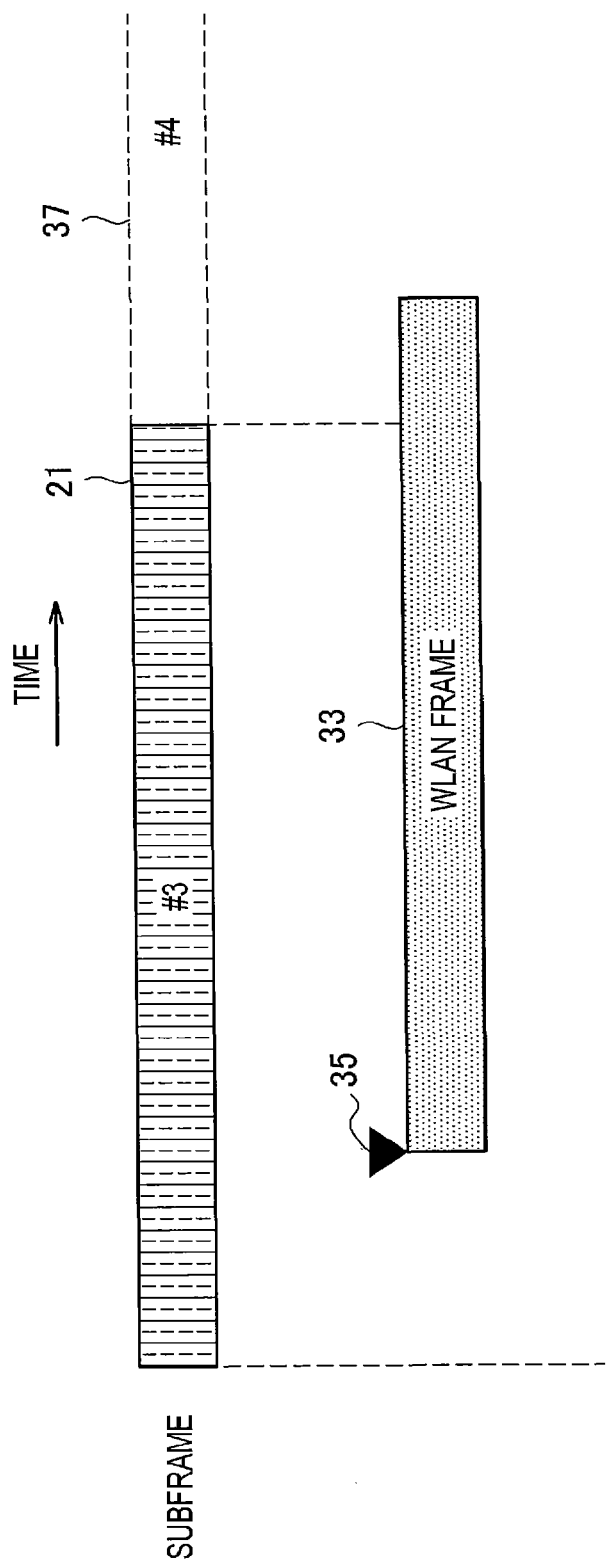
FIG. 14 is an explanatory diagram illustrating an example of stop of wireless communication in a shared band over an additional stop period.

FIG. 14 is an explanatory diagram illustrating an example of stop of wireless communication in the shared band over the additional stop period. Referring to FIG. 14, the stop period 21 (subframe) described with reference to FIG. 10 is illustrated. For example, a wireless LAN frame 33 transmitted in the shared band within the stop period 21 does not end in the stop period 21. For example, the base station 100 continuously detects a signal of the wireless LAN frame 33 in the shared band without interruption over at least the cellular IFS from a time point 35 of the stop period 21 to the ending time point of the stop period 21. In this case, the base station 100 further stops the wireless communication in the shared band over an additional stop period 37 (that is, a subframe of which a subframe number is 4). Also, the wireless LAN frame 33 may be a beacon frame or may be another frame (for example, an RTS frame, a CTS frame, an ACK frame, or a data frame).

Thus, for example, it is possible to prevent interference from occurring in the shared band between the wireless LAN and the cellular system in a period immediately after the stop period.
(7) Operation After Stop Period
(a) Retransmission of Data in Frequency Band for Cellular System For example, the base station 100 (the first control unit 153) retransmits data transmitted in the shared band before starting of the stop period after starting of the stop period in another frequency band for the cellular system. Hereinafter, a specific example of this point will be described with reference to FIG. 15.

Figure 15:
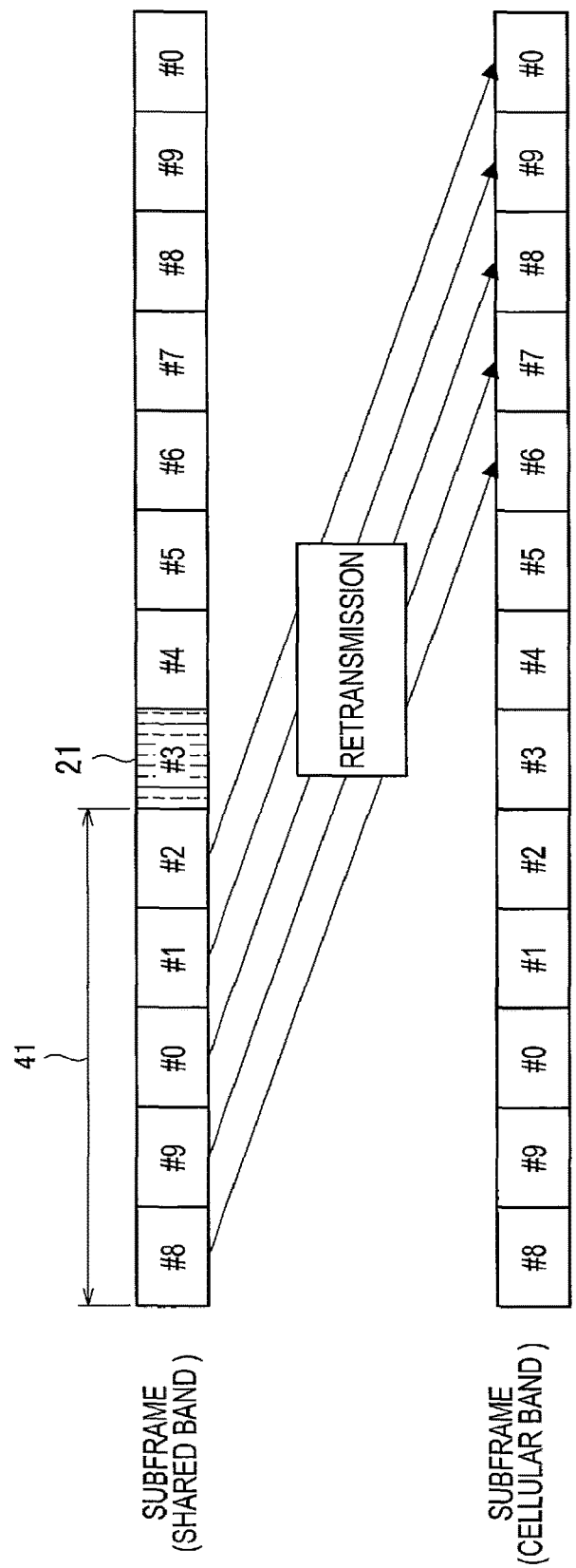
FIG. 15 is an explanatory diagram illustrating an example of retransmission of data in a frequency band for a cellular system.

FIG. 15 is an explanatory diagram illustrating an example of retransmission of data in the frequency band for the cellular system. A subframe including the stop period 21 is illustrated. In this example, the base station 100 (the first control unit 153) transmits the data in the shared band in a period 41 before starting of the stop period 21. When it is necessary to retransmit the data, the base station 100 (the first control unit 153) retransmits the data after starting of the stop period 21. In particular, the base station 100 (the first control unit 153) retransmits the data in the frequency band (cellular band) for the cellular system after starting of the stop period 21.

Thus, for example, even when the transmission of the wireless LAN frame (for example, the beacon frame) does not end within the stop period and the wireless LAN frame extends from the stop period, interference in the retransmission is avoided. Therefore, for example, it is possible to suppress an increase in retransmission failure after the stop period.

Further, thus, for example, the base station 100 can complete the wireless communication of the base station 100 in a period (that is, a period with the length of the beacon interval) between two stop periods.
(b) Stop of Uplink Transmission The shared band may be a frequency band usable in uplink rather than a downlink dedicated frequency band. In this case, the base station 100 (the first control unit 153) may stop the uplink transmission in the shared band over a predetermined period after ending of the stop period. More specifically, the base station 100 (the first control unit 153) may stop the uplink transmission in the shared band over the predetermined period by not performing scheduling of the uplink transmission for the predetermined period. Hereinafter, a specific example of this point will be described with reference to FIG. 16.

Figure 16:
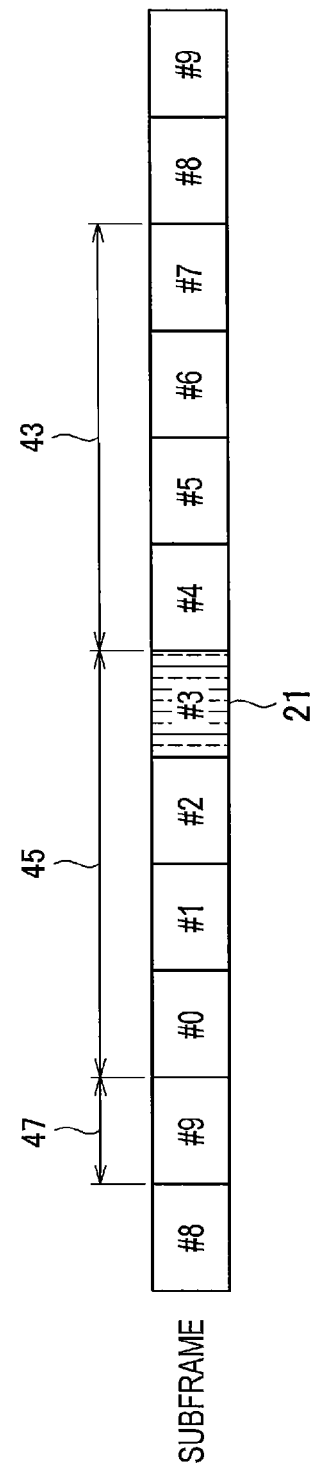
FIG. 16 is an explanatory diagram illustrating an example of stop of uplink transmission.

FIG. 16 is an explanatory diagram illustrating an example of stop of the uplink transmission. Referring to FIG. 16, a subframe including the stop period 21 is illustrated. In this example, the base station 100 (the first control unit 153) stops the uplink transmission in the shared band over a predetermined period 43 after ending of the stop period 21 (that is, 4 subframes after ending of the stop period 21). As a specific operation, the base station 100 (the first control unit 153) does not perform scheduling of the uplink transmission for the predetermined period 43. For example, the base station 100 (the first control unit 153) transmits scheduling information of the uplink transmission before these 4 subframes. In this case, the base station 100 (the first control unit 153) does not transmit the scheduling information of the uplink transmission for a period 45. Also, since the uplink transmission is also stopped for the stop period 21, the base station 100 (the first control unit 153) does not transmit the scheduling information of the uplink transmission for a period 47.

Thus, for example, even when the wireless LAN frame extends from the stop period without ending of the transmission of the wireless LAN frame (for example, the beacon frame) within the stop period, the interference in the uplink is avoided. Therefore, for example, it is possible to suppress an increase in retransmission after the stop period.

Also, as illustrated in FIG. 15, before the ending of the stop period, the base station 100 (the first control unit 153) may transmit the scheduling information of the uplink transmission in the shared band before ending of the stop period and may not transmit the scheduling information of the uplink transmission in the shared band after ending of the stop period. Thus, for example, the base station 100 can complete the wireless communication of the base station 100 for a period between two stop periods (that is, a period with the length of the beacon interval).

«5. Flow of Process»

Next, examples of processes according to the embodiment of the present disclosure will be described with reference to FIGS. 17 to 20.

(1) First Process (Stop of Wireless Communication for Stop Period and Transmission of Beacon)

(a) Example

Figure 17:
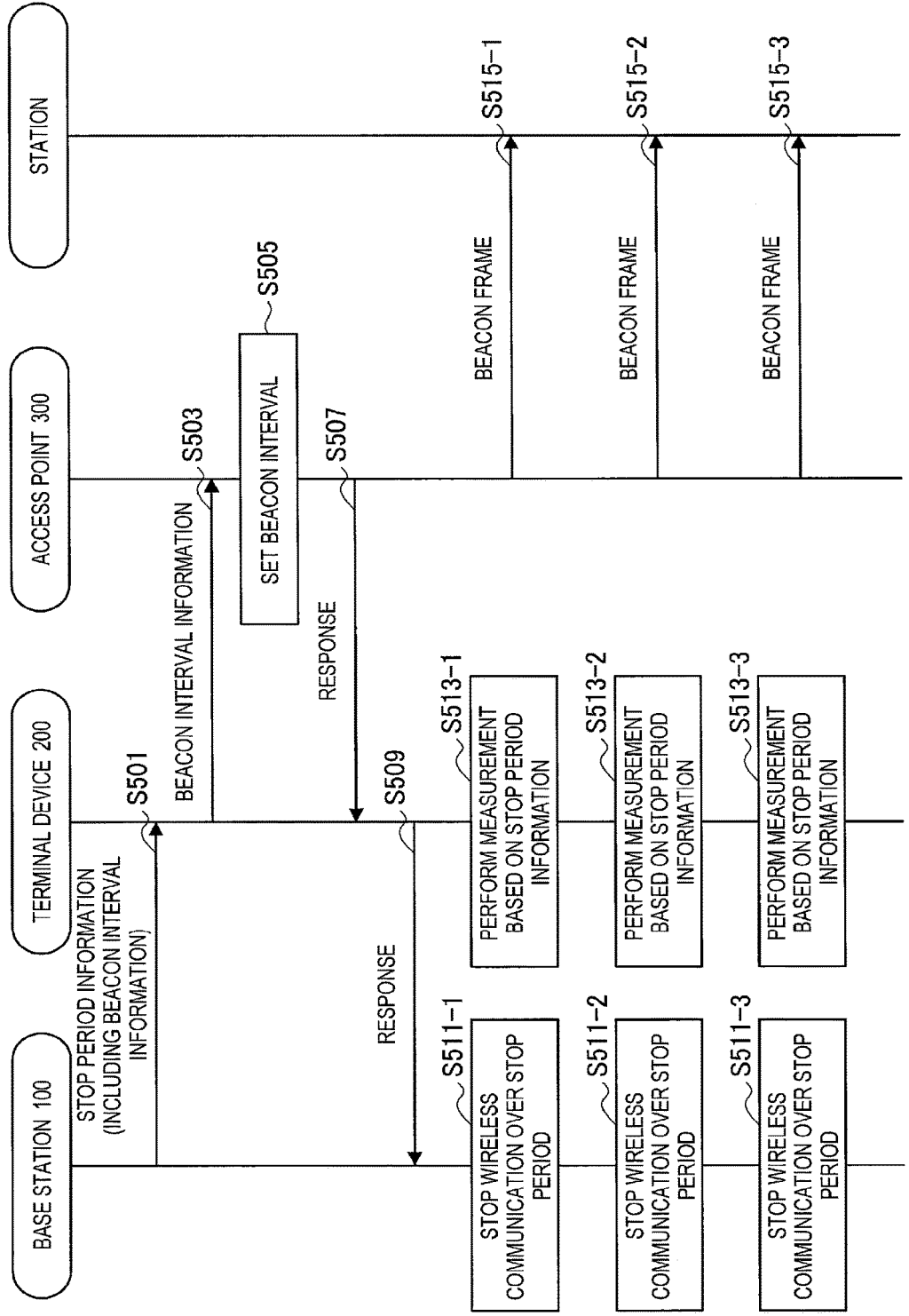
FIG. 17 is a sequence diagram illustrating an example of a schematic flow of a first process according to the embodiment.

FIG. 17 is a sequence diagram illustrating an example of a schematic flow of a first process according to the embodiment of the present disclosure. The first process is a process related to stop of wireless communication and transmission of a beacon for a stop period.

The base station 100 transmits information indicating a period (that is, the stop period) prepared at the beacon interval of the wireless LAN (that is, the stop period information) to the terminal device 200 (S501). For example, the base station 100 transmits the system information including the stop period information. For example, the stop period information indicates the beacon interval and a start timing (for example, offset) of the stop period. That is, the stop period information includes information indicating the beacon interval (that is, the beacon interval information).

The terminal device 200 transmits the wireless LAN frame including the beacon interval information to the access point 300 (S503).

The access point 300 sets the beacon interval as a beacon interval for the access point 300 (S505).

The access point 300 transmits a response corresponding to the wireless LAN frame to the terminal device 200 (S507). Further, the terminal device 200 transmits a response corresponding to the stop period information (S509).

Thereafter, the base station 100 stops the wireless communication in the shared band over the stop period (S511-1, S511-2, and S511-3). The terminal device 200 performs the measurement on the shared band based on the stop period information (S513-1, S513-2, and S513-3). The access point 300 transmits the beacon frame at the set beacon interval (S515). As a result, the access point 300 transmits the beacon frame within the stop period.

(b) Variation

Also, the first process is not limited to the example illustrated in FIG. 17.

For example, the base station 100 may transmit only the beacon interval information to the terminal device 200 rather than the stop period information. In addition, the base station 100 may use the stop period as the MBSFN subframe so that the terminal device 200 can perform appropriate measurement.

For example, the terminal device 200 may not transmit the response to the base station 100.

For example, the base station 100 may individually transmit the message to the terminal device 200 instead of transmitting the system information.

For example, the base station 100 may directly transmit the beacon interval information to the access point 300 without intervention of the terminal device 200. In this case, the base station 100 may transmit the beacon interval information to the access point 300 according to the communication scheme of the cellular system or may transmit the beacon interval information to the access point 300 according to the communication scheme of the wireless LAN. Alternatively, the base station 100 may transmit the beacon interval information to the access point 300 via backhauling.

(2) Second Process (Coordination of Stop Period Between Base Stations)

(a) First Example

Figure 18:
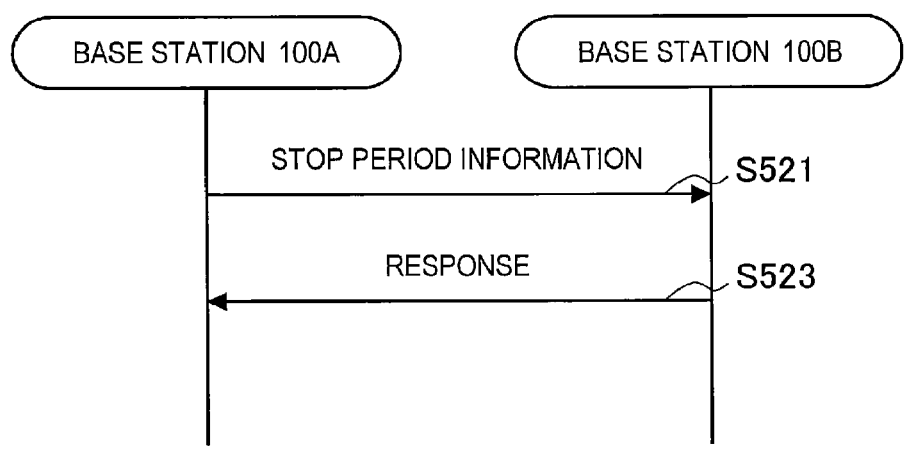
FIG. 18 is a sequence diagram illustrating a first example of a schematic flow of a second process according to the embodiment.

FIG. 18 is a sequence diagram illustrating a first example of a schematic flow of a second process according to the embodiment of the present disclosure. The second process is a process related to coordination of the stop period between the base stations.

A base station A transmits the stop period information indicating the stop period to a base station 100B which is an adjacent base station to the base station 100A (S521). For example, the stop period information indicates the beacon interval and a start timing (for example, offset) of the stop period.

The base station 100B transmits a response message corresponding to the stop period information to the base station 100A (S523). The response message may be a message indicating that the base station 100B applies the stop period or may be a message indicating that the base station 100B does not apply the stop period.

(b) Second Example

Figure 19:
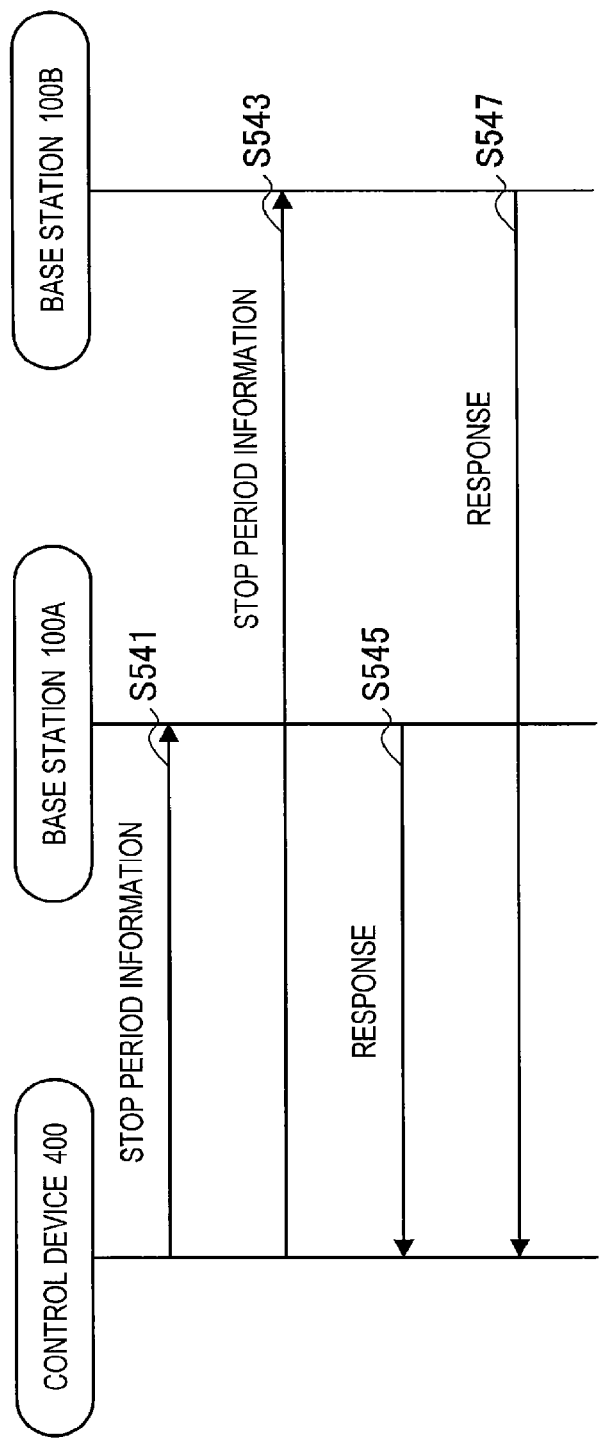
FIG. 19 is a sequence diagram illustrating a second example of a schematic flow of the second process according to the embodiment.

FIG. 19 is a sequence diagram illustrating a second example of a schematic flow of the second process according to the embodiment of the present disclosure. The second process is a process related to coordination of the stop period between the base stations.

The control device 400 transmits the stop period information indicating the stop period to the base stations 100A and 100B (S541 and S543).

Each of the base stations 100A and 100B transmits a response message corresponding to the stop period information to the control device 400 (S545 and S547). The response message may be a message indicating that the base station 100 applies the stop period or may be a message indicating that the base station 100 does not apply the stop period.

(3) Third Process (Operation of Base Station within Stop Period)

Figure 20:
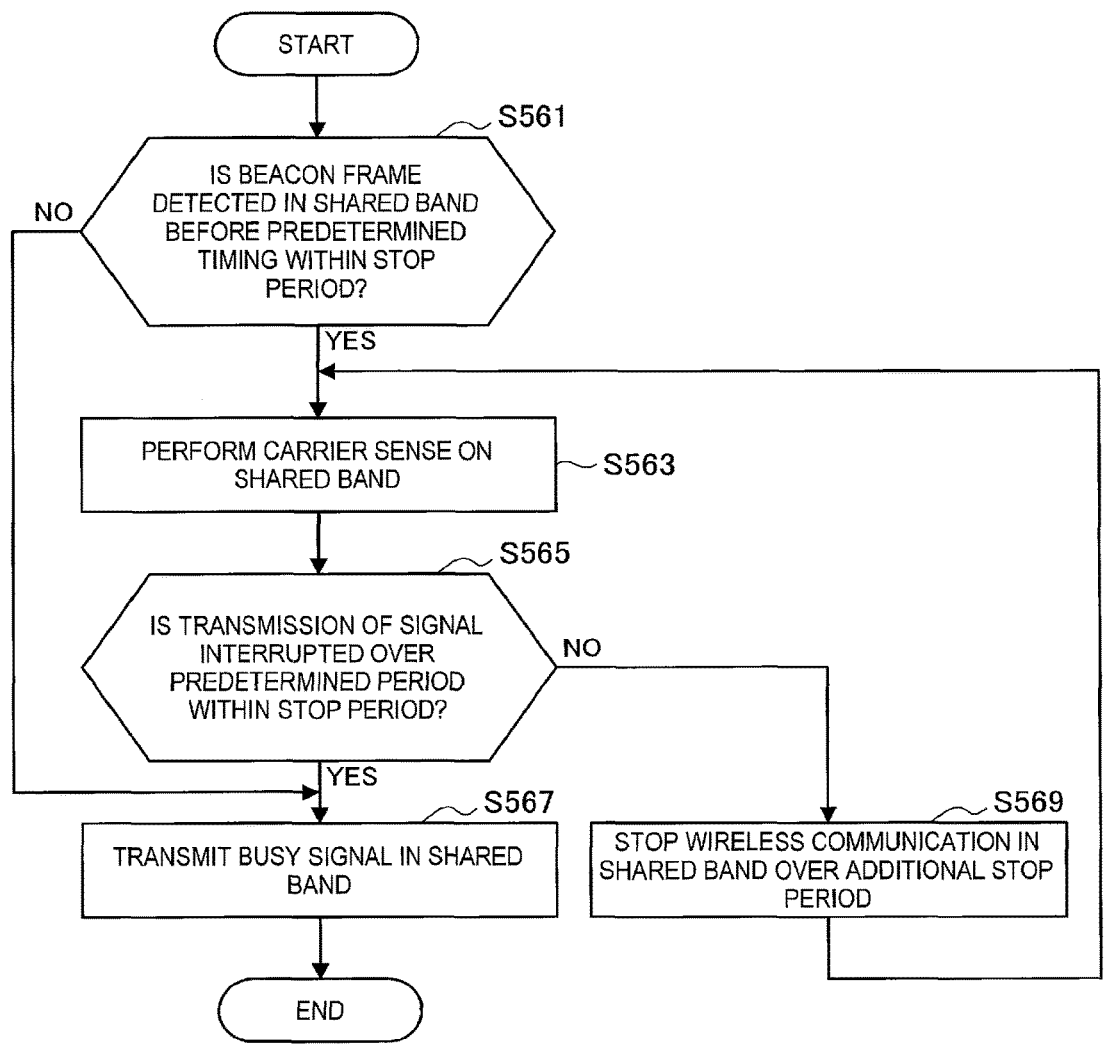
FIG. 20 is a sequence diagram illustrating an example of a schematic flow of a third process according to the embodiment.

FIG. 20 is a sequence diagram illustrating an example of a schematic flow of a third process according to the embodiment of the present disclosure. The third process is a process related to an operation of the base station 100 within the stop period.

When the beacon frame is not detected in the shared band before a predetermined timing within the stop period (NO in S561), the base station 100 transmits a busy signal in the shared band over a period until ending of the stop period (S567). Then, the process ends.

Conversely, when the beacon frame is detected in the shared band before a predetermined timing within the stop period (YES in S561), the base station 100 performs carrier sense on the shared band (S563).

When the transmission of the signal is interrupted over the predetermined time within the stop period as a result of the carrier sense (YES in S565), the base station 100 transmits the busy signal in the shared band over the period until the ending of the stop period (S567). Then, the process ends.

Conversely, when the transmission of the signal is not interrupted over the predetermined time within the stop period as a result of the carrier sense (NO in S565), the base station 100 stops the wireless communication in the shared band over the additional stop period continued from the stop period (S569). Then, the process returns to step S563.

«6. Application Examples»

A technology according to the present disclosure can be applied to various products. For example, the control device 400 may be realized as any kind of server such as a tower server, a rack server, or a blade server. In addition, at least some of the constituent elements of the control device 400 may be realized in a module (for example, an integrated circuit module configured in one die or a card or a blade inserted into a slot of a blade server) mounted on a server.

For example, the base station 100 may be implemented as a type of eNB such as a macro eNB or a small eNB. The small eNB may be an eNB to cover a cell smaller than a macro cell such as a pico eNB, a micro eNB, or a home (femto) eNB. Conversely, the base station 100 may also be realized as another type of base station, such as a Node B or a base transceiver station (BTS). The base station 100 may also include a main unit that controls wireless communication (also called a base station device), and one or more remote radio heads (RRHs) placed in a location separate from the main unit. Also, various types of terminals to be described below temporarily or semi-permanently execute a base station function and therefore may operate as the base station 100. Further, at least part of components of the base station 100 may be implemented in a base station device or a module for the base station device.

In addition, the terminal device 200 may be realized as, for example, a mobile terminal such as a smartphone, a tablet personal computer (PC), a notebook PC, a portable game console, a portable/dongle-style mobile router, or a digital camera, or as an in-vehicle terminal such as a car navigation device. In addition, the terminal device 200 may also be realized as a terminal that conducts machine-to-machine (M2M) communication (also called a machine-type communication (MTC) terminal). Furthermore, at least a part of constituent elements of the terminal device 200 may be realized in a module mounted onboard these terminals (for example, an integrated circuit module configured on a single die).

For example, the access point 300 may be realized as a wireless LAN access point (which is also referred to as a wireless base station) that has no router function or has a router function. The access point 300 may be realized as a mobile wireless LAN router. Furthermore, at least a part of constituent elements of the access point 300 may be realized in wireless communication modules mounted in such devices (for example, integrated circuit modules configured in one die).

<7.1. Application Examples Regarding Control Device>

Figure 21:
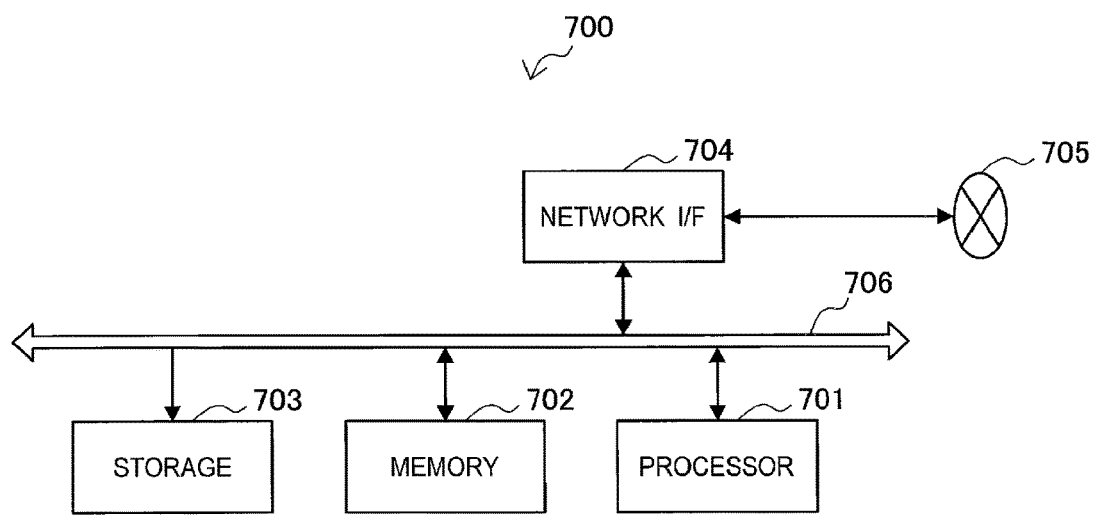
FIG. 21 is a block diagram illustrating an example of a schematic configuration of a server.

FIG. 21 is a block diagram illustrating an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP) and controls various functions of the server 700. The memory 702 includes a random access memory (RAM) and a read-only memory (ROM) and stores a program and data which is executed by the processor 701. The storage 703 can include a storage medium such as a semiconductor memory or a hard disk.

The network interface 704 is a wired communication interface that connects the server 700 to a wired communication network 705. The wired communication network 705 may be a core network such as an evolved packet core (EPC) or a packet data network (PDN) such as the Internet.

The bus 706 connects the processor 701, the memory 702, the storage 703, and the network interface 704 to each other. The bus 706 may include two or more buses (for example, a high-speed bus and a low-speed bus) with different speeds.

In the server 700 illustrated in FIG. 21, the information acquiring unit 431 and/or the control unit 433 described with reference to FIG. 9 may be mounted on the processor 701. As an example, a program causing the processor to function as the information acquiring unit 431 and/or the control unit 433 (in other words, a program causing the processor to perform operations of the information acquiring unit 431 and/or the control unit 433) may be installed in the server 700, and the processor 701 may execute the program. As another example, a module including the processor 701 and the memory 702 may be mounted on the server 700 and the information acquiring unit 431 and/or the control unit 433 may be mounted on the module. In this case, the module may store a program causing the processor to function as the information acquiring unit 431 and/or the control unit 433 in the memory 702, and the program may be executed by the processor 701. As described above, the server 700 or the module may be provided as a device including the information acquiring unit 431 and/or the control unit 433, or the program causing the processor to function as the information acquiring unit 431 and/or the control unit 433 may be provided. In addition, a readable recording medium recording the program may be provided.

<7.2. Application Examples Regarding Base Station>

(First Application Example)

FIG. 31 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Figure 22:
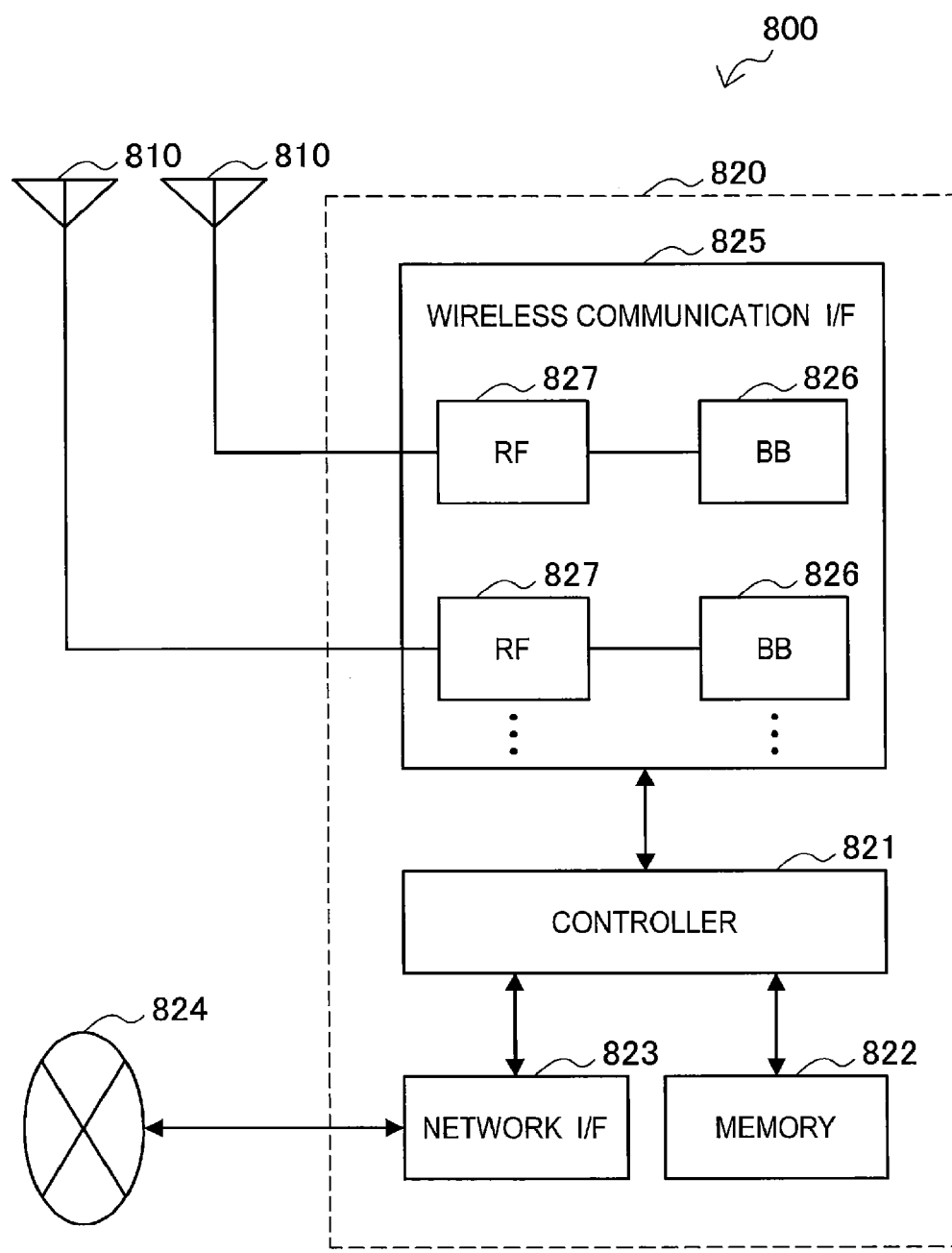
FIG. 22 is a block diagram illustrating a first example of a schematic configuration of an eNB.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 22. For example, the multiple antennas 810 may be compatible with multiple frequency bands used by the eNB 800. Although FIG. 22 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a wireless communication interface for radio backhaul. If the network interface 823 is a wireless communication interface, the network interface 823 may use a higher frequency band for wireless communication than a frequency band used by the wireless communication interface 825.

The wireless communication interface 825 supports any cellular communication scheme such as LTE and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-mentioned logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 22. For example, the multiple BB processors 826 may be compatible with multiple frequency bands used by the eNB 800. The wireless communication interface 825 may include the multiple RF circuits 827, as illustrated in FIG. 22. For example, the multiple RF circuits 827 may be compatible with multiple antenna elements. Although FIG. 22 illustrates the example in which the wireless communication interface 825 includes the multiple BB processors 826 and the multiple RF circuits 827, the wireless communication interface 825 may also include a single BB processor 826 or a single RF circuit 827.

Further, the wireless communication interface 825 may support wireless LAN communication schemes (for example, one or more of the wireless LAN standards such as IEEE 802.11a, 11b, 11g, 11n, 11ac, and 11ad) in addition to the cellular communication scheme. In this case, the wireless communication interface 825 may include the BB processor 826 (and the RF circuit 827) of the wireless LAN communication scheme.

In the eNB 800 illustrated in FIG. 22, one or more constituent elements (for example, the information acquiring unit 151, the first control unit 153 and/or the second control unit 155) included in the processing unit 150 described with reference to FIG. 6 may be implemented in the wireless communication interface 825. Alternatively, at least a part of these constituent elements may be implemented in the controller 821. As one example, the eNB 800 is equipped with a module including a part (for example, the BB processor 826) or all of the wireless communication interface 825 and/or the controller 821, and the one or more constituent elements may be implemented in the module. In this case, the above-mentioned module may store a program for causing the processor to function as the one or more constituent elements (in other words, a program for causing the processor to execute the operation of the one or more constituent elements) and execute the program. As another example, a program for causing the processor to function as the one or more constituent elements is installed in the eNB 800, and the wireless communication interface 825 (for example, the BB processor 826) and/or the controller 821 may execute the program. As mentioned above, the eNB 800, the base station device 820, or the above-mentioned module may be provided as the device including the one or more constituent elements, and the program for causing the processor to function as the one or more constituent elements may be provided. Also, a readable storage medium storing the above-mentioned program may be provided.

Also, in the eNB 800 illustrated in FIG. 22, the wireless communication unit 120 described with reference to FIG. 6 may be implemented in the wireless communication interface 825 (for example, the RF circuit 827). Also, the antenna unit 110 may be implemented in the antenna 810. Also, the network communication unit 130 may be implemented in the controller 821 and/or the network interface 823.

(Second Application Example)

Figure 23:
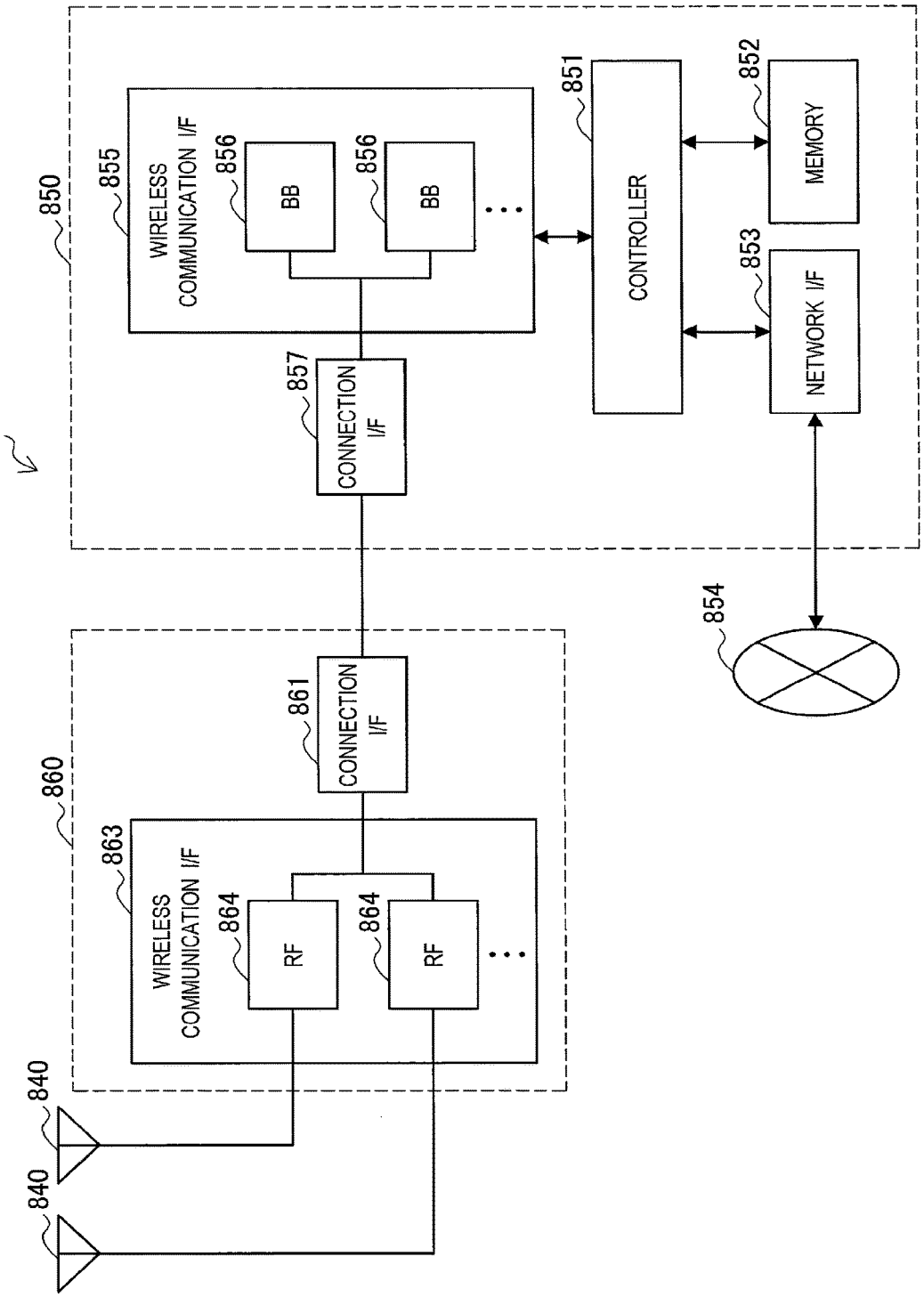
FIG. 23 is a block diagram illustrating a second example of a schematic configuration of an eNB.

FIG. 23 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 23. For example, the multiple antennas 840 may be compatible with multiple frequency bands used by the eNB 830. Although FIG. 23 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 22.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 22, except the BB processor 856 is connected to the RF circuit 864 of the RRH 860 via the connection interface 857. The wireless communication interface 855 may include the multiple BB processors 856, as illustrated in FIG. 23. For example, the multiple BB processors 856 may be compatible with multiple frequency bands used by the eNB 830. Although FIG. 23 illustrates the example in which the wireless communication interface 855 includes the multiple BB processors 856, the wireless communication interface 855 may also include a single BB processor 856.

Further, the wireless communication interface 855 may support wireless LAN communication schemes (for example, one or more of the wireless LAN standards such as IEEE 802.11a, 11b, 11g, 11n, 11ac, and 11ad) in addition to the cellular communication scheme. In this case, the wireless communication interface 855 may include the BB processor 856 of the wireless LAN communication scheme.

Furthermore, in addition to a cellular communication scheme, the wireless communication interface 855 may support a radio LAN communication scheme. In that case, the wireless communication interface 825 may include the BB processor 856 in the radio LAN communication scheme.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-mentioned high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives radio signals via the antenna 840. The wireless communication interface 863 may include multiple RF circuits 864, as illustrated in FIG. 23. For example, the multiple RF circuits 864 may support multiple antenna elements. Although FIG. 23 illustrates the example in which the wireless communication interface 863 includes the multiple RF circuits 864, the wireless communication interface 863 may also include a single RF circuit 864.

In the eNB 830 illustrated in FIG. 23, one or more constituent elements (for example, the information acquiring unit 151, the first control unit 153 and/or the second control unit 155) included in the processing unit 150 described with reference to FIG. 6 may be implemented in the wireless communication interface 855 or the wireless communication interface 863. Alternatively, at least a part of these constituent elements may be implemented in the controller 851. As one example, the eNB 830 is equipped with a module including a part (for example, the BB processor 856) or all of the wireless communication interface 855 and/or the controller 851, and the one or more constituent elements may be implemented in the module. In this case, the above-mentioned module may store a program for causing the processor to function as the one or more constituent elements (in other words, a program for causing the processor to execute the operation of the one or more constituent elements) and execute the program. As another example, a program for causing the processor to function as the one or more constituent elements is installed in the eNB 830, and the wireless communication interface 855 (for example, the BB processor 856) and/or the controller 851 may execute the program. As mentioned above, the eNB 830, the base station device 850, or the above-mentioned module may be provided as the device including the one or more constituent elements, and the program for causing the processor to function as the one or more constituent elements may be provided. Also, a readable storage medium storing the above-mentioned program may be provided.

Also, in the eNB 830 illustrated in FIG. 23, the wireless communication unit 120 described, for example, with reference to FIG. 6 may be implemented in the wireless communication interface 863 (for example, the RF circuit 864). Also, the antenna unit 110 may be implemented in the antenna 840. Also, the network communication unit 130 may be implemented in the controller 851 and/or the network interface 853.

<7.3. Application Examples Regarding Terminal Device>

(First Application Example)

Figure 24:
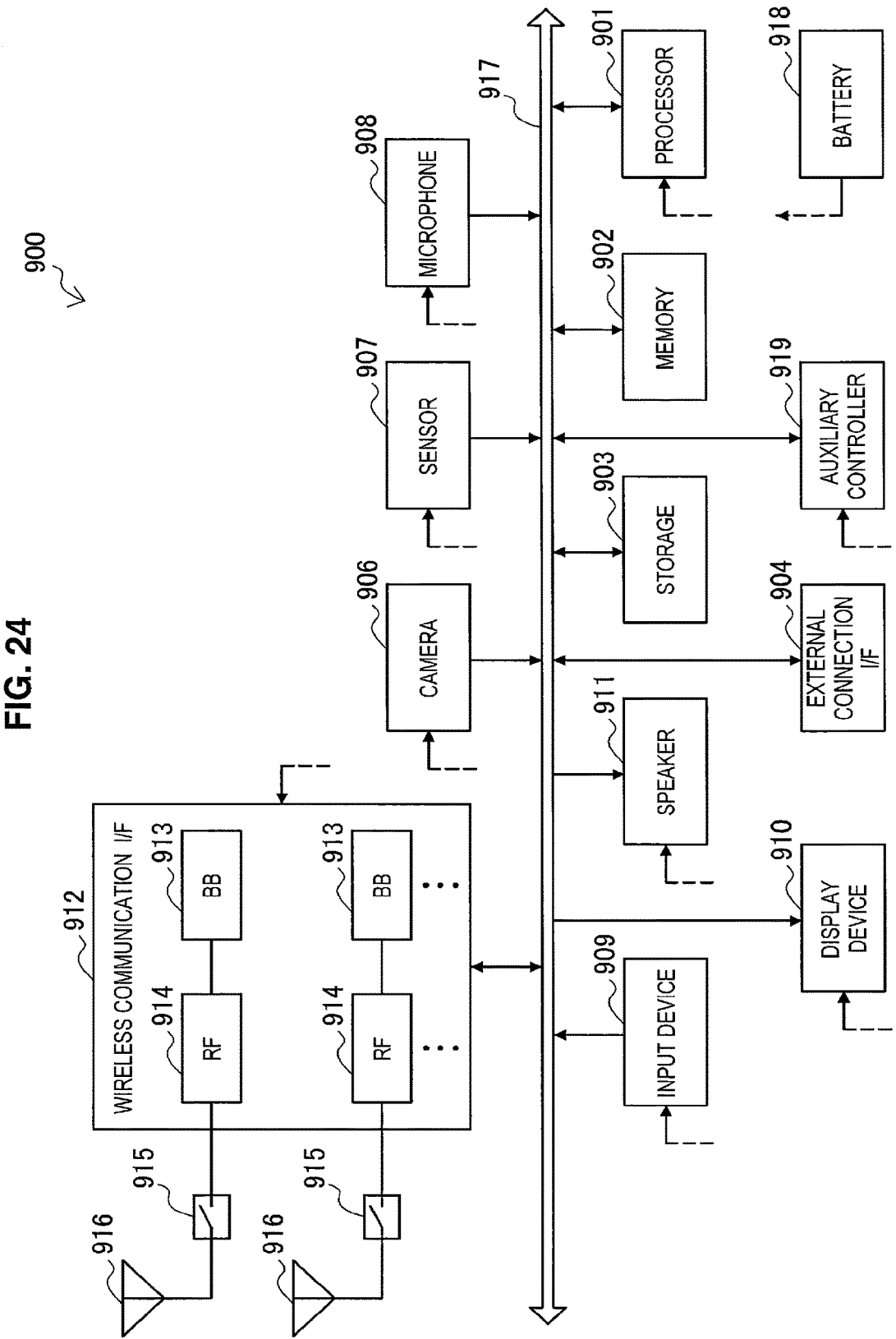
FIG. 24 is a block diagram illustrating an example of a schematic configuration of a smartphone.

FIG. 24 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image.

The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one chip module that has the BB processor 913 and the RF circuit 914 integrated thereon. The wireless communication interface 912 may include the multiple BB processors 934 and the multiple RF circuits 914, as illustrated in FIG. 24. Although FIG. 24 illustrates the example in which the wireless communication interface 912 includes the multiple BB processors 913 and the multiple RF circuits 914, the wireless communication interface 912 may also include a single BB processor 913 or a single RF circuit 914.

Further, the wireless communication interface 912 may support wireless LAN communication schemes (for example, one or more of the wireless LAN standards such as IEEE 802.11a, 11b, 11g, 11n, 11ac, and 11ad) in addition to the cellular communication scheme. In this case, the wireless communication interface 912 may include the BB processor 913 (and the RF circuit 914) of the wireless LAN communication scheme. In addition, the wireless communication interface 912 may support another type of wireless communication scheme such as a short-range wireless communication scheme or a proximity wireless communication scheme. In this case, the wireless communication interface 912 may include the BB processor 913 (and the RF circuit 914) for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive radio signals. The smartphone 900 may include the multiple antennas 916, as illustrated in FIG. 24. Although FIG. 24 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 24 via feeder lines, which are partially shown as dashed lines in the figure. The auxiliary controller 919 operates a minimum necessary function of the smartphone 900, for example, in a sleep mode.

In the smartphone 900 illustrated in FIG. 24, one or more constituent elements (the information acquiring unit 241, the measurement unit 243 and/or the control unit 245) included in the processing unit 240 described with reference to FIG. 7 may be implemented in the wireless communication interface 912. Alternatively, at least a part of these constituents elements may be implemented in the processor 901 or the auxiliary controller 919. As one example, the smartphone 900 is equipped with a module including a part (for example, the BB processor 913) or all of the wireless communication interface 912, the processor 901 and/or the auxiliary controller 919, and the above-mentioned one or more constituent elements may be implemented in the module. In this case, the above-mentioned module may store a program for causing the processor to function as the above-mentioned one or more constituent elements (in other words, a program for causing the processor to execute the operation of the above-mentioned one or more constituent elements) and execute the program. As another example, a program for causing the processor to function as the above-mentioned one or more constituent elements is installed in the smartphone 900, and the wireless communication interface 912 (for example, the BB processor 913), the processor 901, and/or the auxiliary controller 919 may execute the program. As mentioned above, the smartphone 900 or the above-mentioned module may be provided as the device including the above-mentioned one or more constituent elements, and the program for causing the processor to function as the above-mentioned one or more constituent elements may be provided. Also, a readable storage medium storing the above-mentioned program may be provided.

Also, in the smartphone 900 illustrated in FIG. 24, the wireless communication unit 220 described, for example, with reference to FIG. 7 may be implemented in the wireless communication interface 912 (for example, the RF circuit 914). Also, the antenna unit 210 may be implemented in the antenna 916.

(Second Application Example)

Figure 25:
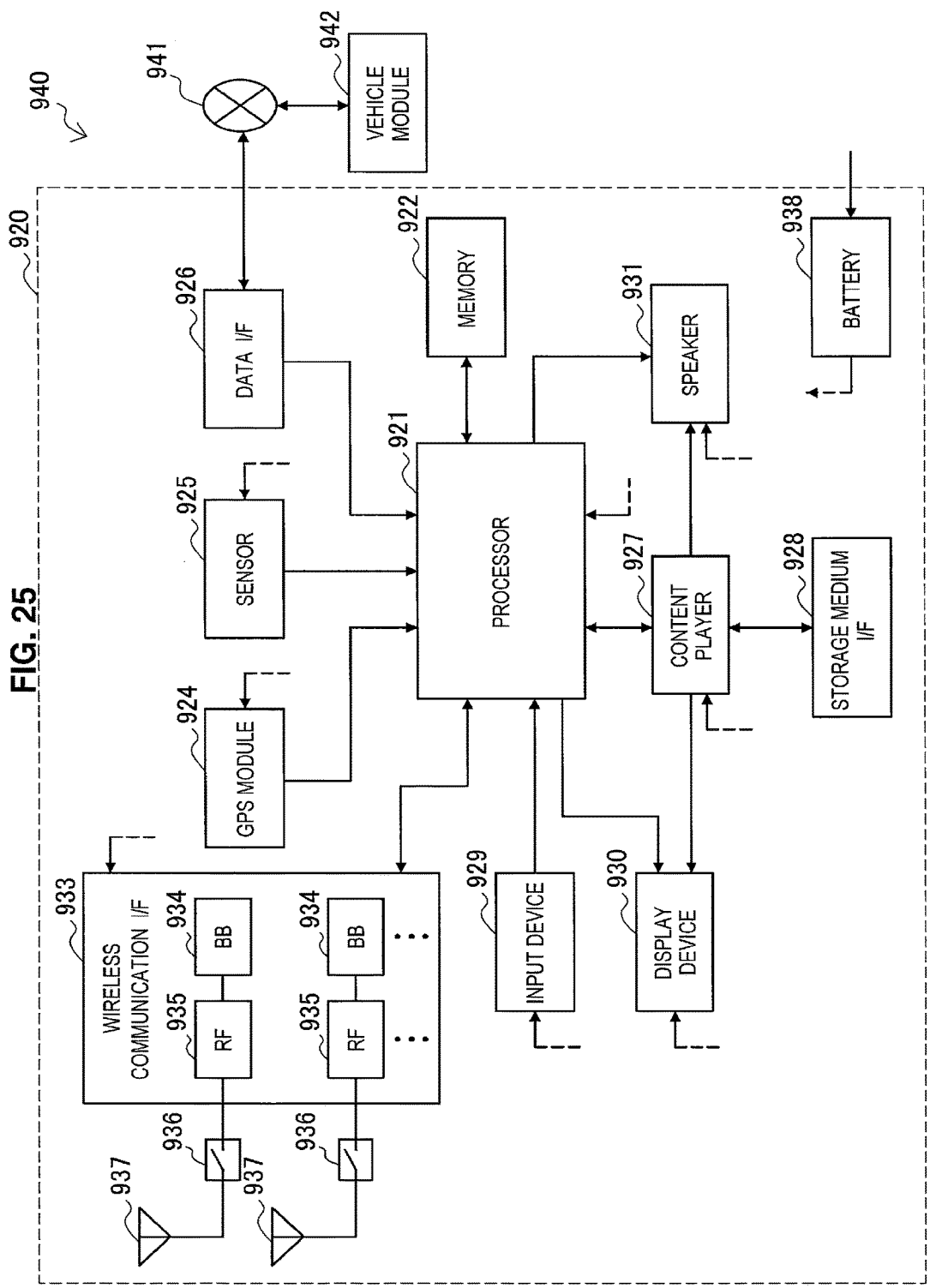
FIG. 25 is a block diagram illustrating an example of a schematic configuration of a car navigation device.

FIG. 25 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LET and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 25. Although FIG. 25 illustrates the example in which the wireless communication interface 933 includes the multiple BB processors 934 and the multiple RF circuits 935, the wireless communication interface 933 may also include a single BB processor 934 or a single RF circuit 935.

Further, the wireless communication interface 933 may support wireless LAN communication schemes (for example, one or more of the wireless LAN standards such as IEEE 802.11a, 11b, 11g, 11n, 11ac, and 11ad) in addition to the cellular communication scheme. In this case, the wireless communication interface 933 may include the BB processor 934 (and the RF circuit 935) of the wireless LAN communication scheme. In addition, the wireless communication interface 933 may support another type of wireless communication scheme such as a short-range wireless communication scheme or a proximity wireless communication scheme. In this case, the wireless communication interface 933 may include the BB processor 934 (and the RF circuit 935) for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation device 920 may include the multiple antennas 937, as illustrated in FIG. 25. Although FIG. 25 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 25 via feeder lines that are partially shown as dashed lines in the figure. The battery 938 accumulates power supplied form the vehicle.

In the car navigation device 920 illustrated in FIG. 25, one or more constituent elements included in the processing unit 240 (the information acquiring unit 241, the measurement unit 243, and/or the control unit 245) described with reference to FIG. 7 may be implemented in the wireless communication interface 933. Alternatively, at least a part of these constituent elements may be implemented in the processor 921. As one example, the car navigation device 920 is equipped with a module including a part (for example, the BB processor 934) or all of the wireless communication interface 933, and/or processor 921, and the above-mentioned one or more constituent elements may be implemented in the module. In this case, the above-mentioned module may store a program for causing the processor to function as the above-mentioned one or more constituent elements (in other words, a program for causing the processor to execute the operation of the above-mentioned one or more constituent elements) and execute the program. As another example, a program for causing the processor to function as the above-mentioned one or more constituent elements is installed in the car navigation device 920, and the wireless communication interface 933 (for example, the BB processor 934), and/or the processor 921 may execute the program. As mentioned above, the car navigation device 920 or the above-mentioned module may be provided as the device including the above-mentioned one or more constituent elements, and the program for causing the processor to function as the above-mentioned one or more constituent elements may be provided. Also, a readable storage medium storing the above-mentioned program may be provided.

Also, in the car navigation device 920 illustrated in FIG. 25, the wireless communication unit 220 described, for example, with reference to FIG. 7 may be implemented in the wireless communication interface 933 (for example, the RF circuit 935). Also, the antenna unit 210 may be implemented in the antenna 937.

The technology of the present disclosure may also be realized as an in-vehicle system (or a vehicle) 940 including one or more blocks of the car navigation device 920, the in-vehicle network 941, and a vehicle module 942. That is, the in-vehicle system (or the vehicle) 940 may be provided as a device including one or more constituent elements included the processing unit 240 (the information acquiring unit 241, the measurement unit 243, and/or the control unit 245). The vehicle module 942 generates vehicle data such as vehicle speed, engine speed, and trouble information, and outputs the generated data to the in-vehicle network 941.

<7.4. Application Example Regarding Access Point>

Figure 26:
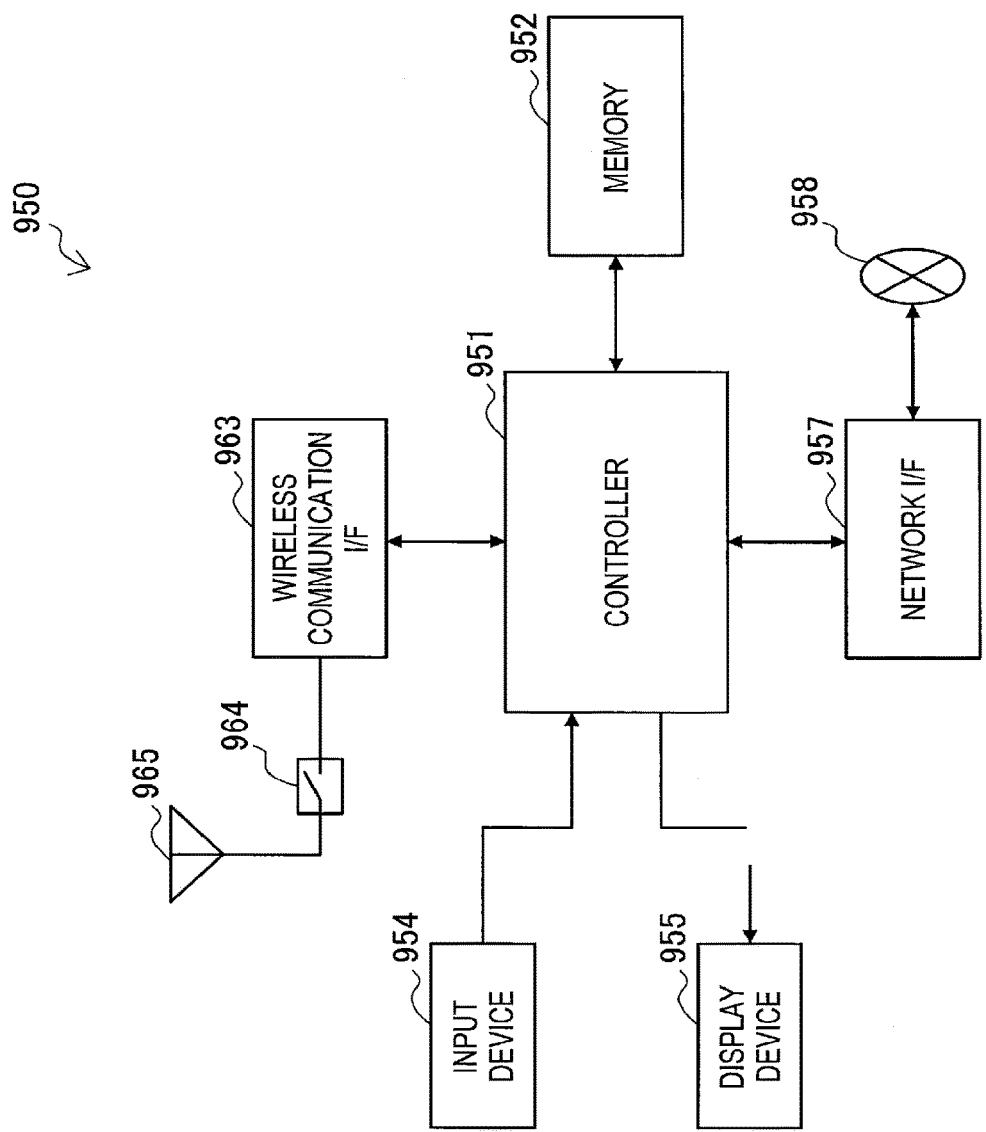
FIG. 26 is a block diagram illustrating an example of a schematic configuration of a wireless access point.

FIG. 26 is a block diagram showing an example of a schematic configuration of a wireless access point 1050 to which the technology of the present disclosure can be applied. The wireless access point 1050 includes a controller 1051, a memory 1052, an input device 1054, a display device 1055, a network interface 1057, a wireless communication interface 1063, an antenna switch 1064, and an antenna 1065.

The controller 1051 may be, for example, a CPU or a digital signal processor (DSP) and operates various functions (for example, access restriction, routing, encryption, firewall, and log management) of the Internet Protocol (IP) layer and higher layers of the wireless access point 1050. The memory 1052 includes a RAM and a ROM and stores a program to be executed by the controller 1051 and various kinds of control data (for example, a terminal list, a routing table, an encryption key, security setting, and a log).

The input device 1054 includes, for example, buttons or switches and receives manipulations from a user. The display device 1055 includes an LED lamp or the like and displays operation status of the wireless access point 1050.

The network interface 1057 is a wired communication interface that connects the wireless access point 1050 to a wired communication network 1058. The network interface 1057 may include a plurality of connection terminals. The wired communication network 1058 may be a LAN such as Ethernet (registered trademark) or a wide area network (WAN).

The wireless communication interface 1063 supports one or more wireless LAN standards of IEEE 802.11a, 11b, 11g, 11n, 11ac, and 11ad to provide a wireless connection to a terminal located nearby as an access point. The wireless communication interface 1063 can typically have a baseband processor, an RF circuit, a power amplifier, and the like. The wireless communication interface 1063 may be a single-chip module on which a memory that stores a communication control program, a processor that executes the program, and a relevant circuit are integrated. The antenna switch 1064 switches a connection destination of the antenna 1065 for a plurality of circuits included in the wireless communication interface 1063. The antenna 1065 has a single antenna element or a plurality of antenna elements and is used for transmission and reception of wireless signals from the wireless communication interface 1063.

In the wireless access point 1050 illustrated in FIG. 26, the information acquiring unit 351 and the setting unit 353 described with reference to FIG. 8 may be implemented in the controller 1051. Alternatively, at least a part of these constituent elements may be implemented in the wireless communication interface 1063. As one example, the wireless access point 1050 is equipped with a module including the controller 1051 and/or the wireless communication interface 1063, and the information acquiring unit 351 and the setting unit 353 may be implemented in the module. In this case, the above-mentioned module may store a program for causing the processor to function as the information acquiring unit 351 and the setting unit 353 (in other words, a program for causing the processor to execute the operation of the information acquiring unit 351 and the setting unit 353) and execute the program. As another example, a program for causing the processor to function as the information acquiring unit 351 and the setting unit 353 is installed in the wireless access point 1050, and the controller 1051 and/or the wireless communication interface 1063 may execute the program. As mentioned above, the wireless access point 1050 or the above-mentioned module may be provided as the device including the information acquiring unit 351 and the setting unit 353, and the program for causing the processor to function as the information acquiring unit 351 and the setting unit 353 may be provided. Also, a readable storage medium storing the above-mentioned program may be provided.

In addition, in the wireless access point 1050 illustrated in FIG. 26, for example, the control unit 355 and/or the wireless communication unit 320 described with reference to FIG. 8 may be mounted on the wireless communication interface 1063.

«7. Conclusion»

The communication devices and the processes according to the embodiments of the present disclosure have been described above with reference to FIGS. 4 to 26. According to the embodiments of the present disclosure, the base station 100 includes the information acquiring unit 151 that acquires the information indicating the period (that is, the stop period) prepared at the beacon interval of the wireless LAN and the first control unit 153 that stops the wireless communication of the base station 100 of the cellular system in the frequency band (that is, the shared band) shared between the cellular system and the wireless LAN over the period. Thus, for example, it is possible to protect the beacon transmitted by the access point of the wireless LAN in the frequency band shared between the cellular system and the wireless LAN.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, the example in which the beacon interval is decided in the cellular system and the access point is notified of the beacon interval has been described, but the present disclosure is not limited to related examples. For example, the beacon interval may be a fixed beacon interval which is decided in advance. In this case, the stop period in which the base station stops the wireless communication in the shared band may be a period prepared at the fixed beacon interval and the fixed beacon interval may be set in advance in the access point 300.

Although an example in which the communication system is a system conforming to LTE, LTE-Advanced, or a compliant communication scheme has been described, the present disclosure is not limited to such an example. For example, the communication system may be the one conforming to another communication standard.

Also, the processing steps in each process in this specification are not strictly limited to execution in a time series following the sequence described in a flowchart or a sequence diagram. For example, the processing steps in each process may be executed in a sequence that differs from a sequence described herein as a flowchart or a sequence diagram, and furthermore may be executed in parallel.

Further, it is also possible to create a computer program for making a processor (such as, for example, a CPU and a DSP) provided at apparatuses (such as, for example, a base station, a base station device or the module of the base station device, a terminal device or the module for the terminal device, an access point or the module for the access point, or a control device or the module for the control device) in the present specification function as components of the above-described apparatuses (for example, the information acquiring unit, and/or the control unit, and so on) (in other words, a computer program for making the processor execute operation of the components of the above-described apparatuses). Further, it is also possible to provide a recording medium having the above-described computer program recorded therein. Further, it is also possible to provide an apparatus (such as, for example, a base station, a base station device or the module of the base station device, a terminal device or the module for the terminal device, an access point or the module for the access point, or a control device or the module for the control device) including a memory having the above-described computer program stored therein and one or more processors which can execute the above-described computer program. Further, a method including the operation of the components (for example, the information acquiring unit, and/or the control unit, and so on) of the above-described apparatuses is included in the technique according to the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)
A device including:
an acquiring unit configured to acquire information indicating a period prepared at a beacon interval of a wireless local area network (LAN); and
a first control unit configured to stop wireless communication of a base station of a cellular system in a frequency band shared between the cellular system and the wireless LAN over the period.

(2)
The device according to (1),
wherein the beacon interval is an interval which is decided in the cellular system and of which an access point of the wireless LAN is notified by the cellular system.

(3)
The device according to (1) or (2),
wherein the device is the base station, a base station device for the base station, or a module for the base station device.

(4)
The device according to (3),
wherein the first control unit notifies an access point of the wireless LAN of the beacon interval.

(5)
The device according to (3) or (4),
wherein the first control unit transmits information indicating the period to a terminal device.

(6)
The device according to (3) or (4),
wherein the period is one or more subframes, and
the first control unit uses each of the one or more subframes as a multimedia broadcast multicast service (MBMS) over single frequency network (MBSFN) subframe.

s(7)
The device according to any one of (3) to (6),
wherein the period is a common period between the base station and an adjacent base station to the base station.

(8)
The device according to (7), further including:
a second control unit configured to transmit information indicating the period to the adjacent base station or receive the information indicating the period from the adjacent base station.

(9)
The device according to any one of (3) to (8),
wherein the first control unit transmits, in the frequency band, a busy signal for preventing a node of the wireless LAN from transmitting a signal, according to a detection result of a beacon frame in the frequency band within the period.

(10)
The device according to (9),
wherein, when the beacon frame is not detected in the frequency band before a predetermined timing within the period, the first control unit transmits the busy signal in the frequency band over a period after the predetermined timing in the period.

(11)
The device according to (9) or (10),
wherein, when the beacon frame is detected in the frequency band within the period, the first control unit transmits the busy signal in the frequency band over a period after ending of the beacon frame in the period.

(12)
The device according to any one of (3) to (11),
wherein, when a wireless LAN frame transmitted in the frequency band within the period does not end within the period, the first control unit further stops the wireless communication of the base station in the frequency band over an additional period continued from the period.

(13)
The device according to any one of (3) to (12),
wherein the first control unit stops uplink transmission in the frequency band over a predetermined period after the period ends.

(14)
The device according to any one of (3) to (13),
wherein the first control unit retransmits data transmitted in the frequency band before starting of the period in another frequency band for the cellular system after the starting of the period.

(15)
The device according to (1) or (2),
wherein the device is a control device capable of communicating with the base station or a module of the control device, and
the first control unit stops wireless communication of the base station in the frequency band over the period by transmitting the information indicating the period to the base station.

(16)
The device according to (15),
wherein the first control unit stops wireless communication of a plurality of base stations of the cellular system in the frequency band over the period by transmitting the information indicating the period to the plurality of base stations.

(17)
A device including:
an acquiring unit configured to acquire information indicating a period prepared at a beacon interval of a wireless LAN and stopping wireless communication of a base station of a cellular system in a frequency band shared between the cellular system and the wireless LAN; and
a measurement unit configured to perform measurement on the frequency band based on the information indicating the period.

(18)
The device according to (17),
wherein the acquiring unit acquires information indicating the beacon interval and transmitted by the base station, and
the device further includes a control unit configured to transmit a wireless LAN frame including the information indicating the beacon interval to an access point of the wireless LAN.

(19)
A device including:
an acquiring unit configured to acquire information indicating a beacon interval of a wireless LAN which is decided in a cellular system and of which an access point of the wireless LAN is notified by the cellular system; and
a setting unit configured to set the beacon interval decided in the cellular system as a beacon interval for the access point.

(20)
A system including:
a base station of a cellular system;
a terminal device; and
an access point of a wireless LAN,
wherein the base station includes an acquiring unit configured to acquire information indicating a period prepared at a beacon interval of the wireless LAN, and a first control unit configured to stop wireless communication of the base station in a frequency band shared between the cellular system and the wireless LAN over the period,
the first control unit included in the base station transmits the information indicating the period to the terminal device,
the terminal device includes an acquiring unit configured to acquire the information indicating the period, and a measurement unit configured to perform measurement on the frequency band based on the information indicating the period,
the beacon interval is an interval decided in the cellular system,
the first control unit included in the base station notifies the access point of the beacon interval, and
the access point includes an acquiring unit configured to acquire information indicating the beacon interval, and a setting unit configured to set the beacon interval as a beacon interval for the access point.

(21)
The device according to any one of (1) to (18) and (20), wherein the period is a period prepared at the beacon interval in order for the access point of a wireless LAN to transmit the beacon frame.

(22)
The device according to any one of (1) to (18) and (20), wherein the period is one or more subframes.

(23)
The device according to any one of (1) to (18) and (20), wherein the period does not includes a subframe in which a synchronization signal is transmitted in a radio frame of the base station in the frequency band.

(24)
The device according to any one of (1) to (18) and (20), wherein the frequency band is a channel of the wireless LAN.

(25)
The device according to (4),
wherein the first control unit notifies the access point of the beacon interval by transmitting information indicating the beacon interval to a terminal device capable of performing communication in both the cellular system and the wireless LAN

(26)
The device according to (4),
wherein the access point is able to perform communication in the cellular system, and
the first control unit notifies the access point of the beacon interval by transmitting information indicating the beacon interval to the access point.

(27)
The device according to any one of (4), (25), and (26),
wherein the first control unit transmits system information indicating the beacon interval.

(28)
The device according to (4),
wherein the first control unit notifies the access point of the beacon interval by transmitting a wireless LAN frame including information indicating the beacon interval.

(29)
The device according to (13),
wherein the first control unit stops uplink transmission in the frequency band over the predetermined period by not performing uplink scheduling transmission for the predetermined period.

(30)
The device according to any one of (1) to (16),
wherein the device is the base station, a base station device for the base station, or a module for the base station device.

(31)
The device according to (17) or (18),
wherein the device is a terminal device or a module for the terminal device.

(32)
The device according to (19),
wherein the device is an access point of the wireless LAN or a module for the access point.

(33)
A method including:
acquiring, by a processor, information indicating a period prepared at a beacon interval of a wireless LAN; and
stopping, by the processor, wireless communication of a base station of a cellular system in a frequency band shared between the cellular system and the wireless LAN over the period.

(34)
A program causing a processor to execute:
acquiring information indicating a period prepared at a beacon interval of a wireless LAN; and
stopping wireless communication of a base station of a cellular system in a frequency band shared between the cellular system and the wireless LAN over the period.

(35)
A readable recording medium having a program recorded thereon, the program causing a processor to execute:
acquiring information indicating a period prepared at a beacon interval of a wireless LAN; and
stopping wireless communication of a base station of a cellular system in a frequency band shared between the cellular system and the wireless LAN over the period.

(36)
A method including:
acquiring, by a processor, information indicating a period prepared at a beacon interval of a wireless LAN and stopping wireless communication of a base station of a cellular system in a frequency band shared between the cellular system and the wireless LAN; and
performing, by the processor, measurement on the frequency band based on the information indicating the period.

(37)
A program causing a processor to execute:
acquiring information indicating a period prepared at a beacon interval of a wireless LAN and stopping wireless communication of a base station of a cellular system in a frequency band shared between the cellular system and the wireless LAN; and performing measurement on the frequency band based on the information indicating the period.

(38)

A readable recording medium having a program recorded thereon, the program causing a processor to execute:

acquiring information indicating a period prepared at a beacon interval of a wireless LAN and stopping wireless communication of a base station of a cellular system in a frequency band shared between the cellular system and the wireless LAN; and performing measurement on the frequency band based on the information indicating the period.

(39)

A method including:

acquiring, by a processor, information indicating a beacon interval of a wireless LAN which is decided in a cellular system and of which an access point of the wireless LAN is notified by the cellular system; and setting, by the processor, the beacon interval decided in the cellular system as a beacon interval for the access point.

(40)

A program causing a processor to execute:

acquiring information indicating a beacon interval of a wireless LAN which is decided in a cellular system and of which an access point of the wireless LAN is notified by the cellular system; and setting the beacon interval decided in the cellular system as a beacon interval for the access point.

(41)

A readable recording medium having a program recorded thereon, the program causing a processor to execute:

acquiring information indicating a beacon interval of a wireless LAN which is decided in a cellular system and of which an access point of the wireless LAN is notified by the cellular system; and setting the beacon interval decided in the cellular system as a beacon interval for the access point.

REFERENCE SIGNS LIST

1 system
21 stop period
100 base station
151 information acquiring unit
153 first control unit
155 second control unit
200 terminal device
241 information acquiring unit
243 measurement unit
245 control unit
300 access point
351 information acquiring unit
353 setting unit
355 control unit
400 control device
431 information acquiring unit
433 setting unit

The invention claimed is:

1. A device, comprising:
  circuitry for a base station in a cellular system, the circuitry configured to
    acquire information indicating a period, the period prepared at a beacon interval of a wireless local area network (LAN); and
    stop wireless communication over the period in a shared frequency band that is shared between the cellular system and the wireless LAN, wherein
  the base station utilizes the shared frequency band for a predetermined period prior to releasing the shared frequency band to the wireless LAN, and
  the period, at which the wireless communication of the base station is stopped, is within the predetermined period in which the base station utilizes the shared frequency band.

2. The device according to claim 1, wherein the beacon interval is decided in the cellular system and of which an access point of the wireless LAN is notified by the cellular system.

3. The device according to claim 1, wherein the device is a module for the base station.

4. The device according to claim 3, wherein the circuitry notifies an access point of the wireless LAN of the beacon interval.

5. The device according to claim 3, wherein the circuitry transmits second information indicating the period to a terminal device.

6. The device according to claim 3, wherein
  the period is one or more subframes, and
  the circuitry uses each of the one or more subframes as a multimedia broadcast multicast service (MBMS) over single frequency network subframe.

7. The device according to claim 3, wherein the period is a common period between the base station and an adjacent base station.

8. The device according to claim 7, wherein the circuitry is configured to transmit second information indicating the period to the adjacent base station or receive the information indicating the period from the adjacent base station.

9. The device according to claim 3, wherein the circuitry is configured to transmit, in the shared frequency band according to a detection result of a beacon frame in the shared frequency band within the period, a busy signal for preventing a node of the wireless LAN from transmitting a signal.

10. The device according to claim 9, wherein the circuitry is configured to transmit, when the beacon frame is not detected in the shared frequency band before a predetermined timing within the period, the busy signal in the shared frequency band over a second period after the predetermined timing in the period.

11. The device according to claim 9, wherein the circuitry is configured to transmit, when the beacon frame is detected in the shared frequency band within the period, the busy signal in the shared frequency band over a period after ending of the beacon frame in the period.

12. The device according to claim 3, wherein the circuitry is configured to stop, when a wireless LAN frame transmitted in the shared frequency band within the period does not end within the period, the wireless communication of the base station in the shared frequency band over an additional period continued from the period.

13. The device according to claim 3, wherein the circuitry stops uplink transmission in the shared frequency band over a predetermined period after the period ends.

14. The device according to claim 3, wherein the circuitry retransmits data transmitted in the shared frequency band before starting of the period in another frequency band for the cellular system after the starting of the period.

15. The device according to claim 1, wherein the device communicates with the base station, and
  the circuitry stops wireless communication of the base station in the shared frequency band over the period by transmitting the information indicating the period to the base station.

16. The device according to claim 15, wherein the circuitry stops wireless communication of a plurality of base stations of the cellular system in the shared frequency band over the period by transmitting the information indicating the period to the plurality of base stations.

17. A device, comprising:
circuitry for a terminal device, the circuitry configured to
acquire information indicating a period, the period prepared at a beacon interval of a wireless local area network (LAN); and
perform measurement on a shared frequency band based on the information, the shared frequency band being shared between the cellular system and the wireless LAN, wherein
a base station of a cellular system stops wireless communication in the shared frequency band
the base station utilizes the shared frequency band for a predetermined period prior to releasing the shared frequency band to the wireless LAN, and
the period, at which the wireless communication of the base station is stopped, is within the predetermined period in which the base station utilizes the shared frequency band.

18. The device according to claim 17, wherein the circuitry
acquires second information indicating the beacon interval, the second information being transmitted by the base station, and
transmits a wireless LAN frame including the second information indicating the beacon interval to an access point of the wireless LAN.

19. A device, comprising:
circuitry for an access point of a wireless local area network (LAN), the circuitry configured to
acquire information indicating a beacon interval of the wireless LAN, the information decided in a cellular system, and the access point being notified by the cellular system; and
set the beacon interval as a beacon interval for the access point, wherein
a base station, of the cellular system, utilizes a shared frequency band for a predetermined period prior to releasing the shared frequency band to the wireless LAN, the shared frequency band being shared between the cellular system and the wireless LAN,
the base station stops wireless communication, in the shared frequency band, over a period that is prepared at the beacon interval, and
the period, at which wireless communication of the base station is stopped, is within the predetermined period in which the base station utilizes the shared frequency band.

20. A system comprising:
a base station of a cellular system;
a terminal device; and
an access point of a wireless local area network (LAN), wherein
the beacon interval is an interval decided in the cellular system,
the base station includes first circuitry configured to
acquire information indicating a period, the period prepared at a beacon interval of the wireless LAN, and
stop wireless communication over the period in a shared frequency band that is shared between the cellular system and the wireless LAN,
the terminal device includes second circuitry configured to
acquire the information indicating the period, and
perform measurement on the shared frequency band based on the information,
the first circuitry notifies the access point of the beacon interval,
the access point includes third circuitry configured to
acquire the information, and
set the beacon interval as a beacon interval for the access point,
the base station utilizes the shared frequency band for a predetermined period prior to releasing the shared frequency band to the wireless LAN, and
the period, at which the wireless communication of the base station is stopped, is within the predetermined period in which the base station utilizes the shared frequency band.

* * * * *